(12) United States Patent
Endo et al.

(10) Patent No.: US 6,500,911 B1
(45) Date of Patent: Dec. 31, 2002

(54) POLYESTER DIOL AND DERIVED POLYURETHANE AND ACRYLIC COPOLYMER

(75) Inventors: Toshio Endo, Ohtake (JP); Takuya Miho, Yamaguchi-ken (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/744,345

(22) PCT Filed: May 22, 2000

(86) PCT No.: PCT/JP00/03265

§ 371 (c)(1),
(2), (4) Date: Mar. 8, 2001

(87) PCT Pub. No.: WO00/71598

PCT Pub. Date: Nov. 30, 2000

(30) Foreign Application Priority Data

| May 20, 1999 | (JP) | 11-140727 |
| May 20, 1999 | (JP) | 11-140739 |
| May 20, 1999 | (JP) | 11-140745 |
| May 20, 1999 | (JP) | 11-140749 |
| Aug. 18, 1999 | (JP) | 11-231307 |

(51) Int. Cl.$^7$ .............................................. C08G 18/42
(52) U.S. Cl. ..................... 528/73; 528/906; 428/364
(58) Field of Search ................... 528/73, 906; 428/364

(56) References Cited

U.S. PATENT DOCUMENTS 4,895,902 A * 1/1990 Lodoen et al.
5,922,882 A * 7/1999 Mori et al.
6,037,393 A * 3/2000 Okumura et al.

FOREIGN PATENT DOCUMENTS

| EP | 0 855 393 A1 | 7/1998 |
| JP | A-58059212 | 4/1983 |
| JP | A-09316060 | 7/1998 |
| JP | A-10265557 | 10/1998 |
| JP | A-11001822 | 1/1999 |
| JP | A-11292952 | 10/1999 |

OTHER PUBLICATIONS

International Search Report for Application No. PCT/JP00/03265, Aug., 2000.

* cited by examiner

Primary Examiner—Rachel Gorr
(74) Attorney, Agent, or Firm—Morgan & Finnegan, LLP

(57) ABSTRACT

The invention provides polyester dials suitable for preparation of polyurethanes, and provides polyurethanes derived therefrom. The invention also provides spandex filaments prepared from these polyurethanes, which exhibit improved elasticity, tensile strength, and resistance to hydrolysis. The present invention also provides dialkyl amino group-containing polyol additives having a high solubility in dimethylacetamide solvent, which when incorporated into a polyurethane protect the polyurethane and derived spandex filaments from deterioration or discoloration, and confer an improved modulus of elasticity. The polyurethanes and spandex filaments of the invention provide fabrics having a soft feeling, excellent hydrolysis resistance, wrinkle resistance, and adhesive properties, and which are particularly suitable for preparation of an artificial leather.

15 Claims, No Drawings

POLYESTER DIOL AND DERIVED POLYURETHANE AND ACRYLIC COPOLYMER

TECHNICAL FIELD

The present inventions No. 1 and No. 2 relate to a spandex filament (a polyurethane elastic fiber) which is excellent in view of a recovering ability of elasticity, high tensile strength and, further, hydrolysis resistance, and relate to a polyurethane which can provide thereof and, further, relate to a polyester diol.

The present invention No. 3 relates to a spandex filament which is excellent in view of hydrolysis resistance and a novel polyurethane which can provide thereof.

The present invention No. 4 relates to a polyurethane which is excellent in weatherability. In more detail, it relates to a polyurethane having a (washing resistance) property in which the weatherability does not almost lower even though being repeatedly washed, and relates to a spandex filament comprising the polyurethane.

The present invention No. 5 relates to a dialkyl amino group-contained acrylic-based copolymer which is useful as a high molecular-state amine stabilizer for a polyurethane. In more detail, the present invention relates to an improvement of the amine stabilizer for, particularly, a polyurethane/spandex filament and a film. It is to be noted that the terminology "spandex" employed in the No. 5 means a synthesized elastomeric composition having a long chain which contains at least 85% by weight of a segment-state polyurethane.

The present invention No. 6 relates to a polyurethane having properties which are excellent in a soft feeling, hydrolysis resistance, wrinkle resistance, and an adhesive property and, particularly, it is excellent as an artificial leather.

TECHNICAL BACKGROUND

In the present inventions No. 1 and No. 2, a polyurethane having a linear-state structure is obtained by allowing to react a long chain diol having hydroxyl groups at both terminals with an organic diisocyanate and a diol or a diamine, etc. which is named a relatively low molecular weight chain extender having two active hydrogens. Concerning a recovering ability of elasticity and hydrolysis resistance in thus-obtained polyurethane, various attempts for an improvement have been proposed. As described in JP-A-58059212 Official Gazette, although a polyurethane using a polyethylene glycol adipate polyester is excellent in a recovering ability of elasticity, it is poor in hydrolysis resistance.

Further, although a 1,4-butylene glycol adipate polyester has a certain extent of hydrolysis resistance, a recovering ability of elasticity is poor in a polyurethane therefrom. Still further, although a polyurethane prepared from a polycaprolactone polyol is excellent in hydrolysis resistance, weatherability, and heat resistance, it is poor in a recovering ability of elasticity. In the JP-A-58059212 Official Gazette, there is described a technology using a specified polycaprolactone polyester polyol obtained by an esterification reaction of a polyester polyol synthesized by a dehydration esterification of neopentylglycol with adipic acid with ε-caprolactone as a method for solving a drawback of a polycaprolactone-based polyurethane. Further, in the JP-A-11001822 Official Gazette, there are disclosed polyurethane elastic fibers which are excellent in alkali-hydrolysis resistance in which there are employed 2-n-butyl-2-ethyl-1,3-propane diol and 2,2-diethyl-1,3-propane diol as a diol component which constructs a polyester polyol.

In relation to the present invention No. 2, in JP-A-63097617 Official Gazette, there is described a spandex filament, etc. which is improved in bacteria resistance, and which is prepared from a poly(2,2-dimethyl-1,3-propane dodecanedioate).

However, since the recovering ability of elasticity and hydrolysis resistance are not always sufficient in the polyurethane described in the JP-A-58059212 Official Gazette, there is desired a polyurethane in which those are improved. Further, although the polyurethane elastic fibers in the JP-A-11001822 Official Gazette are excellent in hydrolysis resistance, it is desired to further improve a recovering ability of elasticity and strength. Still further, in the spandex filaments described in the JP-A-630978617 Official Gazette, there is desired a further improved strength.

In relation to the present invention No. 3, a polyurethane having a linear structure is obtained by allowing to react a long chain diol having hydroxyl groups at both terminals with an organic diisocyanate and a relatively low molecular weight diol or diamine which is named a chain extender having two active hydrogens.

For improvement of characteristics of thus-obtained polyurethane, various proposes have been made. For example, in the JP-A-11001822 Official Gazette, there are disclosed polyurethane elastic fibers which are excellent in alkali hydrolysis resistance in which there are employed 2-n-butyl-2-ethyl-1,3-propane diol and 2,2-diethyl-1,3-propane diol as a diol component which constructs a polyester polyol.

Further, in JP-A-63097617 Official Gazette, there is described a spandex filament, etc. which is improved in bacteria resistance, and which is prepared from a poly(2,2-dimethyl-1,3-propane dodecanedioate).

However, although the polyurethane described in the JP-A-11001822 Official Gazette is excellent in a certain extent of hydrolysis resistance, there is further desired an improvement.

Also in the spandex filament described in the JP-A-63097617 Official Gazette, it is in the same situation.

The polyurethane having a linear structure in relation to the present invention No. 4 is prepared by allowing to react a long chain diol having hydroxyl groups at both terminals with an organic diisocyanate and a relatively low molecular weight diol or diamine which is named a chain extender having two active hydrogens.

Thus-obtained polyurethanes are employed for a variety of uses, for example, a thermoplastic elastomer, a hard or soft urethane foam, an adhesive, an artificial leather, a synthetic leather, a coating, and an elastic fiber (a spandex filament), etc.

The polyurethanes are naturally excellent in weatherability (including a light resistance) and durability and, in order to further give weatherability, there are employed publicly-known ultraviolet ray absorbents, for example, benzotriazoles such as 2-(2'-hydroxy-5'-methylphenyl)benzotriazole and 5-chloro-2-(2'-hydroxy-3', 5'-di-t-butylphenyl) benzotriazole, and benzophenones such as 2,4-dihydroxybenzophenone and 2-hydroxy-4-octyloxybenzophenone.

However, since the conventional ultraviolet ray absorbents are a low molecular weight compound having a low boiling point, the addition thereof to a polyurethane causes various inconveniences.

For example, the addition of a large amount of the ultraviolet ray absorbents causes a phase separation, resulting in that whiteness and mechanical strength are lowered in the polyurethane.

Therefore, although the ultraviolet ray absorbent is added as a small amount as possible and, in the case, light resistance is not elevated until a satisfying extent in the polyurethane. Further, since the ultraviolet ray absorbent is lost by evaporation or decomposed during processing or molding, or it oozes out on the surface of a molded article, it becomes impossible to give a stable light resistance over a long time of period. Still further, when a spandex filament product is repeatedly washed, the ultraviolet ray absorbent is removed from the product, and an effect is gradually reduced.

By the way, an object is not limited to the polyurethane, in order to solve the above-described drawbacks, there is tried an attempt (JP-A-60038411 Official Gazette, JP-A-62181360 Official Gazette, and JP-A-03281685 Official Gazette, etc.) for giving a polymerizable double bond such as vinyl group to the above-described ultraviolet ray absorbent, for highly-polymerizing the absorbent to improve a compatibility with a variety of resins, and for preventing evaporation, thermal decomposition, and bleeding, etc. of the ultraviolet ray absorbent.

However, these ultraviolet ray absorbable polymers also have a drawbacks as described below, and room for an improvement remains. That is, although thermoplastic resins such as thermoplastic polyurethane resins have an exceedingly high mechanical strength and those are widely employed as a various molding materials, since the thermoplastic polyurethane resins have a drawback of a decline in the mechanical strength by decomposition due to alkali components, and there has been desired an improvement of chemical resistance such as an alkali resistance and solvent resistance.

It is to be noted that JP-A-10265557 Official Gazette describes a lactone-modified polyol made from a polyol having an ultraviolet ray absorbable group. However, it does not describe the use thereof as a constructing component for a polyester diol which is a raw material for a polyurethane.

In relation to the present invention No. 5, a segment-state polyurethane is well known, which is prepared by forming an isocyanate-terminated polymer through allowing to react a high molecular weight diol (most of those are a polyether glycol or a polyester glycol) with an organic diisocyanate, and by chain-extending through allowing to react thereof with a diamine or a diol.

The terminology "fiber" includes staple fibers and continuous filaments.

U.S. Pat. No. 3,428,711 by Hunt discloses the use of a high molecular weight tertiary aminoalkyl acrylate and methacrylate for stabilizing a segment-state polyurethane, and a large commercial use is found out as fibers for spandex. Hunt discloses a large amount of such additives. A preferred stabilizer disclosed by Hunt is a copolymer of diisopropyl amino ethylmethacrylate (hereinafter, named "DIPAM") which has a steric hindrance with n-decylmethacrylate (hereinafter, named "DM"). The copolymer (hereinafter, named "poly(DIPAM/DM)") provides a polymer for a spandex which has a large resistance to deterioration by exposure to chlorine than a similar amine which does not have a steric hindrance.

Additives containing a tertiary amino group having a high molecular weight and a steric hindrance are useful for preventing deterioration and discoloration of for a spandex polymer. However, the additives are occasionally cause a problem in the preparation and/or a change to worse of properties in a fiber prepared from the spandex polymer. For example, the use of the poly(DIPAM/DM) additives causes a certain kind of a problem in the case of dry-spinning a filament from a spandex polymer solution. Dimethyl acetoamide (hereinafter, named "DMAc") is a solvent to be most preferably employed for the preparation of the spandex polymer solution. The poly(DIPAM/DM), an antioxidant, and other additives such as pigments are usually changed to a slurry together with the DMAc, followed by being mixed with the spandex polymer solution prior to spinning. However, such the slurry usually prepared at room temperatures occasionally causes a phase-separation in the case that a high molecular weight amine lacks a solubility to the DMAc solvent. The phase-separation has a possibility of causing aggregation of the additives, a problem during spinning and/or an uniform distribution of the additives into a solution for spinning and filaments spun therefrom. That is, the polymer for spandex containing the poly(DIPAM/DM) or the (DPAM) additives adversely affects to a preparation step because of inferiority of solubility to solvent when being spun, and it causes a certain kind of drawback to elasticity in filaments prepared from the spandex polymer, that is, an undesired decline (that is, permanent extension (set)) of elasticity in the spandex filaments made by dry-spinning.

A great parts of high molecular weight tertiary aminoalkyl (meth)acrylate additives have any one of or both drawbacks.

On the other hand, JP-A-02086655 by Roden et al suggests the DIPAM and a hydroxybutyl acrylate- or methacrylate-based copolymer in order to provide an additive containing a high molecular weight tertiary amine having a steric hindrance which is employed for a spandex polymer.

However, in the copolymer described in the JP-A-02086655, although it suppresses a manifestation of the decline (that is, permanent extension (set)) in elasticity related to the use of already known additives containing a high molecular weight tertiary amino group having a steric hindrance to a certain extent, it is not always sufficient in solubility to the DMAc solvent, and it still has a possibility of a manifestation of the decline in elasticity.

In relation to the present invention No. 6, it is usually and widely known that an artificial leather is obtained by processing of adding a variety of polymer compounds to a nonwoven sheet-like material primarily composed of an ultra-fine fiber. As the polymer compounds in the case, there are employed many elastic polymer compounds such as a polyurethane, etc. in order to obtain physical properties such as a soft and elastic feeling as an artificial leather, durability, and dimensional stability. And, the elastic polymer compounds are coated on a nonwoven sheet-like material as a solution dissolved in an organic solvent, and then, very often moisture-solidified.

On the other hand, since the organic solvent employed in the case is often a substance which is very inflammable and highly toxic, many attention must be paid when recollecting the solvent for preventing a fire and a danger by toxicity. Further, there is a drawback that the solvent is expensive and many costs are required for recollecting it from a diluted aqueous solution.

Because of the various drawbacks, a variety of investigations are made for shifting from an organic solvent type to a water-based emulsion in the elastic polymer compound for coating on the nonwoven sheet-like material. However, it is the existing state that there is not still obtained an artificial leather having a satisfying a feeling and physical properties using a water-based emulsion.

In general, a polyurethane having a linear structure is obtained by allowing to react a long chain diol having hydroxyl groups at both terminals with an organic diisocyanate and a relatively low molecular weight diol or diamine which is named a chain extender having two active hydrogens, and a technical background relating to the polyurethane is as described in technical background relating to the present inventions No. 1 and No. 2.

DISCLOSURE OF THE INVENTION

Accordingly, purpose of the present inventions No. 1 and No. 2 is to provide a spandex filament which is excellent in recovering ability of elasticity, strength, and hydrolysis resistance, a polyurethane which provides it, and a polyester diol which provides thereof.

The present inventors found out that the above-described problems can be solved by the use of a polyester diol obtained from a specified branched aliphatic diol, ε-caprolactone, and adipic acid, which is a raw material for a polyurethane, and the present invention No. 1 has been completed.

Further, the present inventors found out that the above-described problems can be solved by the use of a polyester diol obtained from a specified branched aliphatic diol, ε-caprolactone, and an aliphatic dicarboxylic acid having a carbon number of 10–12, and the present invention No. 2 has been completed.

That is, according to the present invention No. 1, as (1), there is provided a polyester diol containing at least one diol selected from the group consisting of 2-n-butyl-2-ethyl-1,3-propanediol, 2,2-diethyl-1,3-propanediol and 2,4-diethyl-1,5-pentanediol, ε-caprolactone, and adipic acid as constructing components.

Further, as (2), there is provided a polyester diol as described in the (1), in which a number average molecular weight ranges in 500–5,000.

Still further, as (3), there is provided a polyester diol as described in the (1) or (2), in which (the content of a constructing unit polyester)/(the content of constructing unit of ε-caprolactone) ranges in 5/95–80/20 (weight ratio), and the polyester is composed of at least one diol selected from the group consisting of 2-n-butyl-2-ethyl-1,3-propanediol, 2,2-diethyl-1,3-propanediol and 2,4-diethyl-1,5-pentanediol, and adipic acid.

Also, as (4), there is provided a polyurethane obtained from a polyester diols as described in any one of the (1)–(3) and an organic diisocyanate.

And also, as (5), there is provided a spandex filament which comprises the polyurethane in the (4).

Further, according to the present invention No. 2, as (1), there is provided a polyester diol containing a branched aliphatic diol, ε-caprolactone, and an aliphatic dicarboxylic acid having a carbon number of 10–12 as constructing components.

Further, as a (2), there is provided a polyester diol as described in the (1), in which a number average molecular weight ranges in 500–5,000.

Still further, as a (3), there is provided a polyester diol as described in the (1) or (2), in which (the content of a constructing unit polyester)/(the content of constructing unit of ε-caprolactone) ranges in 5/95–80/20 (weight ratio), and the polyester is composed of a branched diol and an aliphatic dicarboxylic acid having a carbon number of 10–12.

Also, as (4), there is provided a polyurethane obtained from a polyester diols as described in any one of the (1)–(3) and an organic diisocyanate.

And also, as (5), there is provided a spandex filament which comprises the polyurethane described in the (4).

Purpose of the present invention No. 3 is to provide a spandex filament which is particularly excellent in view of hydrolysis resistance, and a polyurethane which provides thereof.

The present inventors found out that the above-described problems in the present invention No. 3 can be solved by the use of a polyester diol containing a specified diol as a raw material for the polyurethane, and the present invention has been completed.

That is, according to the present invention No. 3, as (1), there is provided a polyurethane obtained by allowing to react a polyester diol containing 2,4-diethyl-1,5-pentanediol as a constructing component with an organic diisocyanate.

Further, as (2), there is provided a polyurethane described in the (1), in which a number average molecular weight ranges in 500–5,000.

Still further, as (3), there is provided a spandex filament which comprises the polyurethane described in the (1) and (2).

Purpose of the present invention No. 4 is to provide a spandex filament in which there is improved washing resistance as a weatherability, and to provide a polyurethane which provides thereof.

The present inventors found out that the above-described problems can be solved by the use of a polyester diol in which a polyol component (A) is composed of a polyol (A1) having an ultraviolet ray-absorbable group or a lactone-modified polyol (A2) therefrom and other polyol (A3) as a raw material for the polyurethane, and the present invention has been completed.

That is, according to the present invention No. 4, as (1), there is provided a polyurethane obtained from a polyetherpolyol (X) containing a polyol component (A) composed of a polyol (A1) having an ultraviolet ray-absorbable group or a lactone-modified polyol (A2) therefrom and other polyol components (A3), adipic acid (B), and an organic diisocyanate (Y).

Further, as (2), there is provided a polyurethane described in the (1), in which the polyol (A1) having an ultraviolet ray-absorbable group is a compound represented by formula (1).

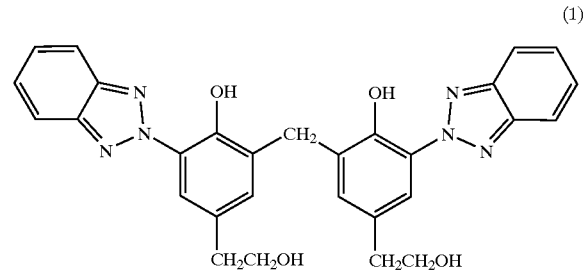

(1)

Still further, as (3), there is provided a polyurethane described in the (1) or (2), in which the lactone is ε-caprolactone.

Also, as (4), there is provided a polyurethane described in any one of the (1)–(3), in which a number average molecular weight of the polyester polyol ranges in 500–5,000.

And also, as (5), there is provided a polyurethane described in any one of the (1)–(4), in which (a constructing unit content of the polyester)/(the content of constructing unit of a lactone) is 5/95–80/20 (weight ratio), and the polyester is composed of the polyol compound (A) and adipic acid.

And also, as the present invention (6), there is provided a polyurethane as described in any one of embodiments (1)–(5), in which a molar ratio of constructing unit content in the polyol $\{(A1)+(A2)\}/\{(A1)+(A2)+(A3)\}$ ranges from 0.01 to 1.0.

And also, as the present invention (7), there is provided a spandex filament which comprises the polyurethane described in any one of the (1)–(6).

Purpose of the present invention No. 5 is to provide a tertiary amino group-contained additive which is employed for a spandex polymer, in which solubility into DMAc which is a solvent is higher, by which the spandex polymer is protected from deterioration and discoloration, and in which a decrease of elasticity (permanent extension (set)) is further improved in relation to the use of an already-known tertiary amino group-contained additive having a high molecular weight and steric hindrance, to provide a polyurethane composition and a spandex composition containing the additives.

The present inventors, as an intensive investigation for solving the above-described problems, found out that an acrylic-based copolymer has a high solubility into DMAc which is a solvent and has an exact effect, and the above-described problems can be solved, which contains a novel tertiary amino group formed by a dialkylaminomethyl(meth) acrylate and a reactive monomer having a specified structure which are an essential copolymerizable component, and the present invention No.5 has been completed.

That is, according to the present invention No. 5, as (1), there is provided a dialkylamino group-contained acrylic-based copolymer formed by an essential copolymer component which includes a dialkylaminoethyl(meth)acrylate represented by a general formula (1) described below and a reactive monomer represented by a general formula (2) described below.

$$CH_2=CRCOOCH_2CH_2NR^0R^0 \qquad (1)$$

(in the formula, R is a hydrogen atom or a methyl group, $R^0$ is an alkyl group having a carbon atom number of 1–4)

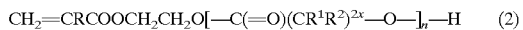
$$CH_2=CRCOOCH_2CH_2O[-C(=O)(CR^1R^2)^{2x}-O-]_n-H \qquad (2)$$

(in the formula, R is a hydrogen atom or a methyl group, x pieces of $R^1$ and $R^2$ are independently a hydrogen atom or an alkyl group having a carbon atom number of 1–12, respectively, and n pieces of ring-opened lactone chains may be identical or different from each other. x is an integer of 4–7, and an average value of n is 1–5)

Further, as (2), there is provided a polyurethane composition characterized by containing a dialkylamino group-contained acrylic-based copolymer described in the present invention (1).

Still further, as (3), there is provided a polyurethane composition as described in the invention (3), in which the content of the dialkylamino group-contained acrylic-based copolymer is 0.5–10% by weight.

Also, as (4), there is provided a spandex composition containing a dialkylamino group-contained acrylic-based copolymer as described in the invention (1).

Also, as (5), there is provided a spandex composition as described in the invention (4), in which the content of the dialkylamino group-contained copolymer is 0.5–10% by weight.

Purpose of the present invention No. 6 is to provide a polyurethane which provides an artificial leather which is excellent in a recovering ability of elasticity, strength, and hydrolysis resistance, that is, which satisfies hydrolysis resistance, wrinkle resistance, an adhesive property, and a feeling.

The present inventors, as a result of an intensive investigation for solving the purpose in the present invention No. 6, have attained to the present invention.

That is, according to the present invention No. 6, as (1), there is provided a polyester diol containing at least an aliphatic dicarboxylic acid, an aliphatic diol, and ε-caprolactone as constructing component units.

Further, as (2), there is provided a polyester diol as described in the (1), in which a number average molecular weight of the polyester polyol ranges in 500–5,000.

Still further, as (3), there is provided a polyester diol as described in the (1) or (2), in which (the content of a polyester constructing unit composed of an aliphatic diol and an aliphatic dicarboxylic acid having a carbon number of 9–12)/(the content of ε-caprolactone constructing unit) ranges in 5/95–80/20 (weight ratio).

Also, as (4), there is provided a polyurethane obtained from a polyester diol as described in any one of the (1)–(3) and an organic diisocyanate.

And also, as (5), there is provided a polyurethane described in the (4) for an artificial leather.

BEST MODE FOR CARRYING OUT THE INVENTION

Hereinafter, embodiments for carrying out the present invention No. 1 and the present invention No. 2 will be illustrated one after another.

The present invention No. 1 will be illustrated

The diol to be employed in the present invention is a specified diol, that is, at least one diol selected from the group of 2-n-butyl-2-ethyl-1,3-propanediol, 2,2-diethyl-1,3-propanediol and 2,4-diethyl-1,5-pentanediol. These may be employed solely, respectively, or in mixing of two kinds. Further, within a range in which an effect by the present invention is not deteriorated, other diol components can be employed. As such the diol compounds, there are enumerated ethylene glycol, propylene glycol, 1,4-butanediol, 1,6-hexanediol, neopentyl glycol, 2-methyl-1,3-propanediol, 3-methyl-1,5-pentanediol, 1,8-nonanediol, diethylene glycol, dipropylene glycol, and 1,4-cyclohexane dimethanol, etc.

Although adipic acid is employed as an acid component for the polyester diol in the present invention, within a range in which an effect by the present invention is not deteriorated, there can be employed other acid components, for example, aliphatic or aromatic dicarboxylic acids such as glutaric acid, pimelic acid, sberic acid, azelaic acid, sebasic acid, dodecanoic acid, 1,11-undecane dicarboxylic acid, terephthalic acid, isophthalic acid, and 5-sulphosodium isophthalic acid. The other acid components may be employed solely or even as a mixture of two or more kinds together with adipic acid. It is to be noted that the acid components which are a raw material may be employed in the form of an ester derivative or an acid anhydride. In the diol relating to the present invention, other constructing components are ε-caprolactone and, within a range in which an effect by the present invention is not deteriorated, there may be even employed a methylated ε-caprolactone such as monomethyl-ε-caprolactone, and trimethyl-ε-caprolactone, γ-butyrolactone, and δ-varelolactone as auxiliary components for ε-caprolactone.

A method for the preparation of the polyester diol in the present invention is not particularly limited and, publicly-known methods can be applied. For example, it can be prepared according to a method described in the JP-A-58059212 Official Gazette. That is, it can be prepared through (a one-pot method) a dehydration esterification and a ring-opening reaction, and a transesterification by heating after mixing the above-described diols, ε-caprolactone, and adipic acid. Otherwise, it can be also prepared by mixing and heating a polyester diol obtained by a dehydration esterification of a diol with adipic acid with a polycaprolactone polyol which is synthesized by allowing to conduct a ring-opening polymerization of ε-caprolactone with a polyvalent alcohol, followed by a transesterification thereof. Further, it can be also prepared by ring-opening polymerization of ε-caprolactone with a polyester polyol having a low molecular weight. Of those, the one-pot method is preferred owing to be convenient.

The reactions can be conducted at 130–240° C., preferably 140–230° C. from a viewpoint of preventing discoloration and from a viewpoint of preventing a decomposition reaction of ε-caprolactone.

In the reactions, catalysts are usually employed in 0.05–1000 ppm by weight, preferably 0.1–100 ppm by weight based on total monomers. As the catalysts, there can be employed organic titanium compounds such as tetrabutyl titanate and tetrapropyl titanate, tin compounds such as dibutyltin laurate, tin octylate, dibutyltin oxide, stannous chloride, stannous bromide, and stannous iodide.

The reactions can be preferably conducted while streaming an inert gas such as nitrogen gas from a viewpoint of preventing discoloration of a desired product obtained.

As content of constructing unit of the polyester diol in the present invention, respective raw materials are employed in a range of a proportion so that (content of constructing unit of the polyester)/(content of constructing unit of ε-caprolactone) becomes a range of 5/95–80/20 (weight ratio), which is composed of at least one kind selected from the group consisting of 2-n-butyl-2-ethyl-1,3-propanediol, 2,2-diethyl-1,3-propanediol and 2,4-diethyl-1,5-pentanediol and adipic acid. Also in the case that a poly-ε-caprolactone is employed, it is the same. In thus-obtained polyester diol, a number average molecular weight ranges in 500–5,000, preferably 1,500–4,000. In the case of not less than 5,000, crystallinity increases in a soft segment, resulting in that there is not apt to be obtained a spandex filament having sufficient physical properties. The number average molecular weight can be measured by a hydroxyl value (JIS K1557).

A polyurethane is prepared from the polyester diol obtained as described hereinabove and an organic diisocyanate. As a method for the preparation of the polyurethane, there are enumerated publicly-known methods, for example, the methods described in the JP-A-58059212 Official Gazette and JP-A-11001822 Official Gazette and, it may be conducted according to these. That is, there is a one-shot method in which a polyester diol, a low molecular weight diol or diamine, etc. which are a chain extender, and an organic diisocyanate are allowed to collectively react under the presence or absence of solvents and a prepolymer method in which a prepolymer is prepared by allowing to previously react a polyester diol with an organic diisocyanate, and then, a low molecular weight diol is allowed to react under the presence or absence of solvents.

A melting polymerization method which is conducted under the absence of solvents is preferred from a viewpoint of costs. In the case, a formulation ratio of raw materials is 0.5–1.5, preferably 0.8–1.2 as (NCO group in the organic diisocyanate)/(total OH group in the polyester diol and a low molecular weight diol). As the solvents, there are enumerated toluene, xylene, ethyl acetate, butyl acetate, methylethyl ketone, dimethyl formamide, and tetrahydrofran, etc.

As the organic diisocyanate to be employed in the present invention, there are enumerated 2,4-tolylene diisocyanate, 2,6-tolylene diisocyanate, p-phenylene diisocyanate, 4,4'-diphenylmethane diisocyanate, m-phenylene diisocyanate, hexamethylene diisocyanate, tetramethylene diisocyanate, 2,4-naphthalene diisocyanate, 4,4'-diphenylene diisocyanate, p-xylene diisocyanate, m-xylene diisocyanate, 4,4'-diisocyanate dicyclohexane, and isophorone diisocyanate, etc. These may be even employed solely or in combination of two or more kinds.

As the above-described low molecular weight diol which is a chain extender, there can be employed the diols to be employed in the present invention or the diol compounds which can be employed together as described hereinabove.

As the diamine which is a chain extender, there can be employed ethylenediamine, hydrazine, isophoronediamine, metaphenylene diamine, 4,4'-diaminodiphenylmethane, 4,4'-diaminodiphenylsulphone, and 3,3'-dichloro-4,4'-diaminodiphenylmethane, etc.

The polyurethane obtained by the above-described methods is employed in a variety of uses in which a usual polyurethane is employed, for example, a thermoplastic elastomer, a hard or soft urethane foam, an adhesive, an artificial leather, and coating, etc., and particularly, it is preferred to employ for a spandex filament.

As a spinning method for obtaining a spandex filament from the polyurethane in the present invention, there can be employed publicly-known methods, for example, a dry-spinning method, a wet-spinning method, and a melt-spinning method, etc. Of the methods, the melt-spinning method is preferred from a viewpoint of costs.

Further, there is obtained a filament having a further high physical properties by heat treatment of an elastic filament after spinning.

In the spandex filament of the present invention, there can be also optionally added an antioxidant such as a phenol-derivative, an ultraviolet ray absorbent such as a substituted benzotriazole, and an anti-blocking agent such as a higher fatty acid metal salt and a silicone compound, etc.

The spandex filament provided by the present invention is excellent in a recovering property of elasticity, strength, and hydrolysis resistance, and it is employed in a general use form for a spandex filament, that is, a mix-knitting and mix-weaving with a nylon and cotton, etc. Particularly, in the case that the cotton is employed as a material for mixing, it shows an excellent hydrolysis resistance even through post treatment steps after mix-knitting and mix-weaving, that is, a boiling-off step, a bleaching step, and a mercerization step, etc. in which it is treated at a high temperature under an acid or alkali atmosphere.

Hereinafter, there are illustrated embodiments for carrying out the present invention No. 2.

As the branched diols to be employed in the present invention, for example, there are enumerated 1,2-propylene glycol, 1,3-butylene glycol, 2-methyl-1,3-propane diol, neopentyl glycol, 3-methyl-1,5-pentane diol, 2-n-butyl-2-ethyl-1,3-propane diol, 2,2-dimethyl-1,3-propane diol, 2,2-diethyl-1,3-propane diol, 2,4-diethyl-1,5-pentane diol, 1,2-hexane glycol, and 1,2-octyl glycol, etc. These may be employed solely or even in mixing of two or more kinds. Further, within a range in which an effect by the present invention is not deteriorated, other diol components can be also employed as auxiliary components. As such the diol compounds, there are enumerated aliphatic diols not having branches, for example, ethylene glycol, 1,3-propylene glycol, 1,4-butanediol, 1,6-hexanediol, 1,8-nonanediol, and diethylene glycol, etc.

As an acid component for the polyester diol relating to the present invention, there are enumerated aliphatic dicarboxylic acids having a carbon number of 10–12, for example, sebasic acid, dodecanoic diacid, and 1,11-undecane dicarboxylic acid, etc. Of those, sebasic acid and dodecanoic diacid are preferred.

It is to be noted that within a range in which an effect by the present invention is not deteriorated, there can be employed other acid components, for example, aliphatic or aromatic dicarboxylic acids such as glutaric acid, adipic acid, pimelic acid, sberic acid, azelaic acid, terephthalic acid, isophthalic acid, 5-sulphosodium isophthalic acid, etc. These other acid components may be even employed solely or even in mixing of two or more kinds together with the aliphatic dicarboxylic acids having a carbon number of 10–12. It is to be noted that the acid components for raw materials may be even employed in the form of an ester derivative or an acid anhydride.

Other components for constructing the polyester diol relating to the present invention is $\epsilon$-caprolactone as well as in the present invention No. 1, and other lactones may be even employed as auxiliary components as well as in the present invention No. 1.

As a method for the preparation of the polyester diol relating to the present invention, there can be applied the same methods as described in the present invention No. 1.

As content of constructing unit of the polyester diol of the present invention, respective raw materials are employed in a range of a proportion so that (content of constructing unit of the polyester which is composed of a branched diol and the aliphatic dicarboxylic acids having a carbon number of 10–12)/(content of constructing unit of $\epsilon$-caprolactone) becomes a range of 5/95–80/20 (weight ratio). Also in the case that a poly-$\epsilon$-caprolactone is employed, it is the same. In thus-obtained polyester diol, a number average molecular weight ranges in 500–5,000, preferably 1,500–4,000. In the case of not less than 5,000, crystallinity increases in a soft segment, resulting in that there is not apt to be obtained a spandex filament having sufficient physical properties. The number average molecular weight can be measured by a hydroxyl value (JIS K1557).

A polyurethane is prepared from the polyester diol obtained as described hereinabove and an organic diisocyanate, and a method for the preparation of the polyurethane is the same as described in the present invention No. 1.

As a low molecular weight diol which is a chain extender, there can be employed a branched aliphatic diol to be employed in the present invention or the above-described diol compounds not having branches which can be employed together therewith. As an diamine which is a chain extender, there can be employed the same ones as exemplified in the present invention No. 1.

The uses of the polyurethane and descriptions relating to the spandex filament in the present invention No. 1 can be applied to the present invention No. 2 as it is.

Hereinafter, there are illustrated embodiments for carrying out the present invention No. 3.

As the diols to be employed in the present invention, there is employed 2,4-diethyl-1,5-pentane diol. However, there may be employed at least one of other diols together with the diol, for example, ethylene glycol, propylene glycol, 2-n-butyl-2-ethyl-1,3-propane diol, 2,2-diethyl-1,3-propane diol, 1,4-butanediol, 1,6-hexanediol, neopentyl glycol, 2-methyl-1,3-propane diol, 3-methyl-1,5-pentane diol, 1,8-nonanediol, diethylene glycol, dipropylene glycol, and 1,4-cyclohexane dimethanol, etc. In the case, 2,4-diethyl-1,5-pentane diol is employed in not less than 5% by mol, and preferably not less than 10% by mol from a viewpoint of an effect by the present invention, and it is preferably employed in not more than 80% by mol, more preferably not more than 70% by mol from an economical viewpoint.

An acid component for the polyester diol relating to the present invention is not particularly limited, there are enumerated aliphatic or aromatic dicarboxylic acids such as glutaric acid, adipic acid, pimelic acid, sberic acid, azelaic acid, sebasic acid, dodecanoic diacid, and 1,11-undecane dicarboxylic acid, terephthalic acid, isophthalic acid, and 5-sulphosodium isophthalic acid, etc. These acid components may be even employed solely or even in mixing of two or more kinds. It is to be noted that the acid components for raw materials may be even employed in the form of an ester derivative or an acid anhydride. Of those, adipic acid is particularly preferred.

A method for the preparation of the polyester diol relating to the present invention is not particularly limited and, publicly-known methods can be applied. In the reactions, catalysts are usually employed in 0.05–1000 ppm by weight, preferably 0.1–100 ppm by weight based on total monomers. As the catalysts, there can be employed organic titanium compounds such as tetrabutyl titanate and tetrapropyl titanate, tin compounds such as dibutyltin laurate, tin octylate, dibutyltin oxide, stannous chloride, stannous bromide, and stannous iodide. The reactions can be preferably conducted while streaming an inert gas such as nitrogen gas from a viewpoint of preventing discoloration of an desired product obtained.

In the polyester diol, a number average molecular weight ranges in 500–5,000, preferably 1,500–4,000. In the case of not less than 5,000, crystallinity increases in a soft segment, resulting in that there is not apt to be obtained a spandex filament having sufficient physical properties. The number average molecular weight can be measured by a hydroxyl value (JIS K1557).

A polyurethane is prepared from the polyester diol obtained as described hereinabove and an organic diisocyanate, and a method for the preparation of the polyurethane is the same as described in the present invention No. 1.

As a low molecular weight diol which is a chain extender, there can be employed a diol to be employed as an essential raw material in the present invention or the above-described diol compounds which can be employed together therewith. As an diamine which is a chain extender, there can be employed the same ones as exemplified in the present invention No. 1.

The uses of the polyurethane and descriptions relating to the spandex filament in the present invention No. 1 can be applied to the present invention No. 3 as it is.

Hereinafter, there are illustrated embodiments for carrying out the present invention No. 4.

The polyol (A1) having ultraviolet ray absorbable groups to be employed in the present invention is not particularly limited and, for example, there is enumerated a diol having two alcoholic hydroxyl groups represented by formula (1) described below.

This is bis[3-(2H-benzotriazole-2-yl)-4-hydroxy-benzene ethanol]. As this diol, there can be employed a synthetic product and a commercially supplied product.

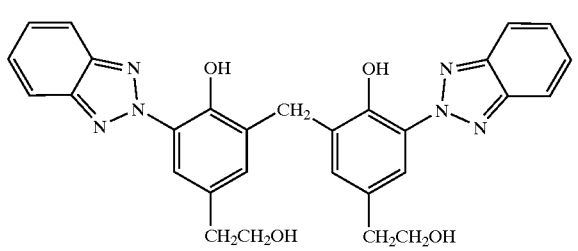

(1)

Further, a lactone-modified polyol is not particularly limited, and there is enumerated a diol compound represented by the formula (2). It is to be noted that the lactone-modified polyol (A2) can be employed solely or together with the polyol (A1) in the preparation of a polyester polyol described hereinafter.

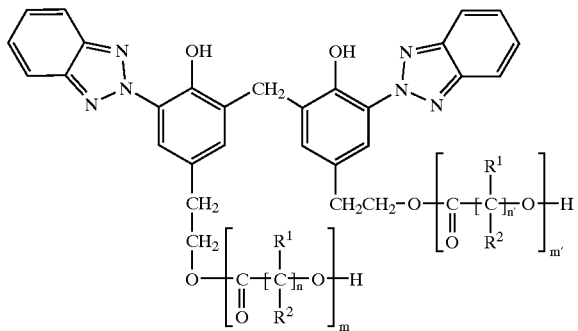

(2)

($R^1$—$R^2$; H, an alkyl group having a carbon number of 1–10, n and n' are an integer of 4–8, and m and m' are an integer of 1–20)

In a method for the preparation of the ultraviolet ray absorbable compound represented by the formula (2), lactones represented by formula (3) described below are introduced into the diol represented by formula (1) described hereinabove by a ring-opening addition polymerization.

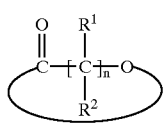

(3)

($R^1$ —$R^2$; H, an alkyl group having a carbon number of 1–10, n and n' are an integer of 4–8)

As the lactones represented by the formula (3) described above, ε-caprolactone, trimethyl-ε-caprolactone, monomethyl-ε-caprolactone, γ-butyrolactone, and δ-varelolactone. Of those, ε-caprolactone is preferred.

As the catalysts to be employed in the ring-opening addition polymerization of the lactones represented by the formula (3) described above to the diol represented by the formula (1) described above, there can be employed organic titanium compounds such as tetraethyl titanate, tetrabutyl titanate, and tetrapropyl titanate, tin compounds such as tin octylate, dibutyltin oxide, dibutyltin laurate, a mono-n-butyltin fatty acid salt, and a halogenated tin compound such as stannous chloride, stannous bromide, and stannous iodide, etc.

Use amount of the catalysts is 0.1–10000 ppm, and preferably 1–5000 ppm based on raw materials to be supplied. In the case that the use amount of the catalysts is less than 0.1 ppm, a ring-opening reaction is remarkably slow and it is not economical. Contrarily, in the case that it is not less than 10000 ppm, although the ring-opening reaction becomes quick, there become unpreferably worse physical properties such as durability and water resistance in a synthetic resin in which a compound obtained is employed.

Reaction temperature is 90–240° C., and preferably 100–220° C.

In the case that the reaction temperature is less than 90° C., the ring-opening reaction of the lactones is remarkably slow, it is not economical. Contrarily, in the case of not less than 240° C., there is caused a decomposition reaction of a polylactone which is addition-polymerized by ring-opening. Accordingly, the both cases are not preferred. Further, a product having a good color hue is obtained by synthesizing in an atmosphere of an inert gas such as nitrogen during the reaction. As described hereinabove, an ultraviolet ray-absorbent of the present invention is synthesized.

These details are as described in the above-described JP-A-10265557 Official Gazette.

As other polyols (A3), for example, there are enumerated ethylene glycol, 1,2-propylene glycol, 1,3-butylene glycol, 2-methyl-1,3-propanediol, neopentyl glycol, 1,4-butanediol, 1,6-hexanediol, neopentyl glycol, 2-methyl-1,3-propanediol, 3-methyl-1,5-pentanediol, 1,8-nonanediol, diethylene glycol, dipropylene glycol, 1,4-cyclohexane dimethanol, 2-n-butyl-2-ethyl-1,3-propanediol, 2,2-diethyl-1,3-propanediol, 2,4-diethyl-1,5-pentanediol, 1,2-hexane glycol, and 1,2-octyl glycol, etc. These may be solely or even in mixing of two or more kinds.

As the acid components in the polyester diol relating to the present invention, adipic acid is employed and, as other acid components, there may be also even employed the same ones as described in the present invention No. 1 by the same embodiments.

A method for the preparation of the polyester polyol relating to the present invention is not particularly limited and, publicly-known methods can be applied. In the reactions, catalysts are usually employed in 0.05–1000 ppm (weight), preferably 0.1–100 ppm based on total monomers. As the catalysts, there can be employed organic titanium compounds such as tetrabutyl titanate and tetrapropyl titanate, tin compounds such as dibutyltin laurate, tin octylate, dibutyltin oxide, stannous chloride, stannous bromide, and stannous iodide. The reactions can be preferably conducted while streaming an inert gas such as nitrogen gas from a viewpoint of preventing discoloration of a desired product obtained.

In the polyester polyol, a number average molecular weight ranges in 500–5,000, preferably 1,500–4,000. In the case of not less than 5,000, crystallinity increases in a soft segment, resulting in that there is not apt to be obtained a spandex filament having sufficient physical properties. The number average molecular weight can be measured by a hydroxyl value (JIS K1557).

As content of constructing unit of the polyester polyol of the present invention, respective raw materials are employed in a range of a proportion so that (the content of constructing unit composed of the polyester and adipic acid)/(content of constructing unit of the lactone) becomes a range of 5/95–80/20 (weight ratio) A polyurethane is prepared from the polyester diol obtained as described hereinabove and an organic diisocyanate, and a method for the preparation of the polyurethane is the same as described in the present invention No. 1.

As a low molecular weight diol which is a chain extender, there can be employed a diol to be employed as an essential raw material in the present invention or the above-described diol compounds not having branches which can be employed together therewith. A diamine which is a chain extender is the same ones as exemplified in the present invention No. 1.

The uses of the polyurethane obtained by the above-described method can be applied to the uses described in the present invention No. 1 and, further, it is preferred to be employed as a spandex filament in which washing resistance is particularly required.

In the present invention No. 4, as a method for giving a spandex filament from the polyurethane, there can be applied the descriptions in the present invention No. 1.

The spandex filament provided by the present invention is excellent in the washing resistance as weatherability, and it is employed in a general use form for a spandex filament, that is, a mix-knitting and mix-weaving with a nylon and cotton, etc.

Particularly, in the case that the cotton is employed as a material for mixing, it shows an excellent weatherability even through post treatment steps after mix-knitting and mix-weaving, that is, a boiling-off step, a bleaching step, and a mercerization step, etc. in which it is treated at a high temperature under an acid or alkali atmosphere. Further, even though it is repeatedly washed after use as a final product, decline of the weatherability is not almost observed.

Hereinafter, there are illustrated embodiments for carrying out the present invention No. 5.

A high molecular-state tertiary amine compound which is appropriate for employing in the present invention is a copolymer of a dialkylaminoethyl(meth)acrylate. In more detail, a dialkylaminoethyl(meth)acrylate represented by a general formula (1) described below is employed as a comonomer.

$$CH_2=CRCOOCH_2CH_2NR^0R^0 \quad (1)$$

(in the formula, R is a hydrogen or a methyl group, $R^0$ is an alkyl group having a carbon number of 1–4)

As a kind of specific monomers, there are employed diisopropyl amino ethylmethacrylate (DIPAM), dimethylaminoethyl methacrylate (DMAM), diethylaminoethyl methacrylate (DEAM), diisopropyl amino ethylacrylate (DIPAA), dimethylaminoethyl acrylate (DMAA), and diethylaminoethyl acrylate (DEAA), etc. Of the monomers, the DIPAM is a most preferably employed monomer.

Use amount of the monomer ranges in usually 60% to 90% by weight, and preferably 70% to 80% by weight in a copolymer.

On the other hand, a comonomer to be copolymerized with the above-described dialkylaminoethyl(meth)acrylate is a reactive monomer represented by a general formula (2) described below.

$$CH_2=CRCOOCH_2CH_2O[-C(=O)(CR^1R^2)^{2x}-O-]_n-H \quad (2)$$

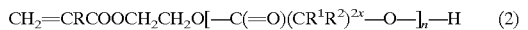

(in the formula, R is a hydrogen or a methyl group, x pieces of $R^1$ and $R^2$ are independently a hydrogen atom or an alkyl group having a carbon number of 1–12, respectively, and n pieces of ring-opened lactone chains may be identical or different from each other. x is an integer of 4–7, and an average value of n is 1–5)

In the case that an average value of n exceeds 5, there is caused a problem in view of solubility to a solvent in a copolymer obtained and compatibility with a polyurethane resin and spandex composition.

A method for the preparation of the reactive monomer comprises allowing to react a lactone represented by a general formula (3) described below with a monoacrylate or methacrylate of ethylene glycol.

$$[C(=O)(CR^1R^2)_x-O] \quad (3)$$

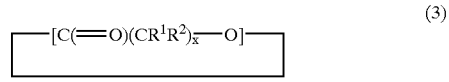

(in the formula, x pieces of $R^1$ and $R^2$ are independently a hydrogen or an alkyl group having a carbon number of 1–12, respectively, and x is an integer of 4–7)

As the lactones represented by the formula (3), there are enumerated ε-caprolactone, trimethyl-ε-caprolactone, monomethyl-ε-caprolactone, γ-butyrolactone, and δ-varelolactone, etc.

Preferred lactones are ε-caprolactone, 4-methyl-ε-caprolactone, 3-methyl-ε-caprolactone, and a mixture thereof.

A more specific method for the preparation is conducted by allowing to react the lactone with a monoacrylate or methacrylate of ethylene glycol under the presence of approximately not more than 200 ppm, and preferably not more than 100 ppm of catalysts.

As the catalysts to be employed in the present invention, there are enumerated one or two or more kinds of organic metal compounds and other metal compounds, for example, tin compounds such as stannous chloride, stannous bromide, stannous iodide, and dibutyltin oxide, or ferric chloride, and other Levis acids and protonic acids. As preferred catalysts, there are enumerated stannous chloride, tin octylate, dibutyltin laurate, and other tin compounds; titanates such as tetraisopropyl titanate, etc.

The reaction is conducted at temperatures of approximately 100–140° C., and preferably approximately 110–130° C. The reaction is conducted at ordinary pressure, and may be even conducted at a higher pressure or a lower pressure. The reaction is conducted at an atmosphere in which oxygen concentration is adjusted to 4% to 8%, whereby, there is preferably suppressed a polymerization of a monoacrylate or a methacrylate of ethyleneglycol. Reaction time of period is approximately 2–30 hours, and preferably approximately 3–20 hours.

The reaction is conducted under the presence of an appropriate inhibitor in order to prevent a polymerization of a double bond in a monoacrylate or a methacrylate of ethyleneglycol. As the inhibitor, there are enumerated monomethylether of hydroquinone, benzoquinone, phenothiazine, methyhydroquinone, 2,5-di-t-butylquinone, hydroquinone, and other free radical (a free group) inhibitors which are publicly-known in a related field. Use amount of the inhibitors is not more than 1000 ppm, preferably not more than 800 ppm, and most preferably not more than 600 ppm.

In a preferred specific example, the method in the present invention is conducted by adding a lactone to a reaction vessel while sparging (dispersing) the lactone by an inert gas such as nitrogen, followed by heating at reaction temperatures (approximately 100° C.–140° C.). The lactone to be employed may be dried using a common desiccating agent such as, for example, Molecular Sieves, prior to adding to the reaction vessel. In the case of attaining to the reaction temperature or immediately after thereof, sparging of the inert gas is changed to an atmospheric mixture in which oxygen concentration is adjusted to 4% to 8%.

Various other methods may be applied. For example, a gas mixture may be even employed only for the purpose of flushing a gas space in the reaction vessel during through the reaction after a reaction system is sparged by the atmospheric gas mixture in which oxygen concentration is adjusted to 4% to 8% for a short time of period, that is, approximately 5–10 minutes, and then, sparging is interrupted. Otherwise, sparging of the inert gas is stopped, and the reaction system is flushed using the mixture through the total reaction system. And, otherwise, the gas mixture is sparged through the system and, separately, the gas space may be even flushed further using an inert gas. Optionally, combination of other methods may be even conducted.

The monoacrylate or methacrylate of ethyleneglycol is mixed with the catalysts and inhibitors, followed by adding mixture thereof to the lactone heated. In other methods, the inhibitors may be even added to the lactone prior to heating. Further, the lactone is added to the heated monoacrylate or methacrylate of ethyleneglycol, or, all reaction materials are added to the reaction vessel in an initial stage, and the reaction may be even conducted. In a style for adding the lactone, the monoacrylate or methacrylate, catalysts, and inhibitors, various variations can be employed. Final reaction mixture is maintained at the reaction temperatures for approximately 2–30 hours.

Further, for example, the present method may be even conducted under the presence of an appropriate solvent not containing an active hydrogen or a polymerizable ethylenic unsaturated group. As such the solvent, there are enumerated a ketone, an ester, an aromatic and aliphatic hydrocarbon etc., and a mixture thereof. As a preferred solvent, there are esters, such as cellosolve acetate, etc.

Preferably, $\epsilon$-caprolactone, 4-methyl-$\epsilon$-caprolactone, 3-methyl-$\epsilon$-caprolactone, and a mixture thereof are allowed to react - with the monoacrylate or methacrylate of ethyleneglycol in a proportion of 1 mol of the acrylate or methacrylate with respect to 1–12 mol of the lactone. Composition thereof may be a solid or a liquid, and most preferred composition is a liquid.

The most preferred composition can be prepared by allowing to react $\epsilon$-caprolactone, 4-methyl-$\epsilon$-caprolactone, 3-methyl-$\epsilon$-caprolactone, and a mixture thereof with the monoacrylate or methacrylate of ethyleneglycol in a proportion of 1 mol of the monoacrylate or methacrylate of ethyleneglycol with respect to 1–5 mol of $\epsilon$-caprolactone, 4-methyl-$\epsilon$-caprolactone, 3-methyl-$\epsilon$-caprolactone, and a mixture thereof.

Reaction mixture is taken out, and it can be employed without refining. Optionally, the reaction mixture can be refined by common methods such as vacuum stripping.

As a method of the preparation of the copolymer of the present invention, there can be applied a preparation method by a usual radical solution polymerization as described in JP-A-02086655 by Roden et al.

Specific detailed preparation method of the copolymer is illustrated in Examples of the present invention.

In the copolymer of the present invention, a number average molecular weight ranges in preferably 2000–2000000, and more preferably 5000–500000, and a weight average molecular weight ranges in preferably 4000–4000000, and more preferably 10000–1000000 from a viewpoint of solubility to solvents and compatibility with a polyurethane and a spandex.

The copolymer relating to the present invention is particularly useful in a polyurethane/spandex filament. The present invention provides an improved polyurethane composition and spandex composition containing a dialkylamino group-contained acrylic based copolymer. The polyurethane composition and the spandex composition containing additives relating to the present invention have an excellent resistance to deterioration and discoloration, and those show an excellent processability and permanent extension property compared to a similar polymer containing a publicly-known high molecular weight tertiary amine additive.

The improved spandex composition of the present invention is prepared from a segmented polyurethane, for example, polyether, a polyester, and a polyesterether. Such the spandex polymers are well known and, above all, those can be prepared by the methods disclosed in U.S. Pat. Nos. 2,929,804, 3,097,192, 3,428,711, 3,533,290, and 3,555,115. The composition of the present invention is most useful in a spandex prepared by the polyether.

The polyurethane composition and the spandex composition relating to the present invention are prepared by allowing to react a polyol and/or a polyester polyol which have hydroxyl groups at both terminals with an organic diisocyanate, and a relatively-low molecular weight diol or diamine, etc. having two active hydrogens which is named a chain extender and, optionally, under the presence of catalysts.

As the polyols, for example, there are enumerated ethyleneglycol, 1,2-propylene glycol, 1,3-butylene glycol, 2-methyl-1,3-propanediol, neopentyl glycol, 1,4-butanediol, 1,6-hexanediol, neopentyl glycol, 2-methyl-1,3-propanediol, 3-methyl-1,5-pentanediol, 1,8-nonanediol, diethylene glycol, dipropylene glycol, 1,4-cyclohexane dimethanol, 2-n-butyl-2-ethyl-1,3-propanediol, 2,2-diethyl-1,3-propanediol, 2,4-diethyl-1,5-pentanediol, 1,2-hexaneglycol, 1,2-octylglycol, a polyol in which there are added ethyleneoxide, propyleneoxide, and butyleneoxide, etc. to those, and a modified product thereof, etc. These may be solely or even in mixing of two or more kinds.

Adipic acid is employed as an acid component for the polyester diol and, as other acid components, there may be even employed other acid components such as aliphatic or aromatic dicarboxylic acids such as glutaric acid, pimelic acid, sberic acid, azelaic acid, sebasic acid, dodecanoic acid, 1,11-undecane dicarboxylic acid, terephthalic acid, isophthalic acid, and 5-sulphosodium isophthalic acid. The other acid components may be employed solely or even as a mixture of two or more kinds. It is to be noted that the acid components which are a raw material may be even employed in the form of an ester derivative or an acid anhydride.

An organic diisocyanate is the same as described in the present invention No. 1.

As a low molecular weight diol which is a chain extender, there can be employed the above-described diol compounds. A diamine which is a chain extender is the same ones as exemplified in the present invention No. 1.

Amount of the additives which are useful for protecting the spandex polymer of the present invention usually ranges in a wide scope from a small amount of 0.5% by weight or so to a large amount of 10% by weight or so. Preferably, concentration of the additives ranges in 2–6% by weight. In less than 0.5% by weight, an effect is poor and, in largely exceeding 10% by weight, characteristics in spandex filament unpreferably are lost.

For adding the dialkylamino(meth)acrylic-based polymer additive in relation to the present invention to a spandex polymer, usual methods can be applied. For example, a solution of the additive may be prepared in the same solvent as for preparing a spandex spinning solution. The solution can be added to the polymer solution before molding of the polymer into a final product, for example, a filament or a film.

Addition of the polymer in relation to the present invention is a general style as an addition method disclosed in U.S. Pat. No. 3,428,711 by Hunt et al, and the disclosure can be referred.

In the spandex polymer composition of the present invention, other various additives can be added for other purposes. In the other various additives, there may be even exist a pigment or a delustering agent, for example, titanium dioxide, an anti-blocking agent, or a lubricant, for example, magnesium stearate and calcium stearate, a whiteness accelerator, for example, Ultramarine Blue, and fillers, for example, talc, etc.

Further, other than the useful uses in fibers and a film, the polyurethane polymer containing the dialkylamino(meth) acrylate of the present invention can be applied in, for example, uses such as an artificial leather, etc.

Hereinafter, there are illustrated embodiments for carrying out the present invention No. 6

As aliphatic diols to be employed in the present invention, in addition to the branched aliphatic diols exemplified in the No. 2 of the present invention, there are enumerated the aliphatic diols not having branches exemplified as auxiliary components in the No. 2 of the present invention. There are employed solely, respectively, and there may be employed in mixing of two or more kinds.

As an acid component for the polyester diol relating to the present invention, there are enumerated aliphatic dicarboxylic acids having a carbon number of 9–12, for example, azelaic acid, sebasic acid, dodecanoic diacid, and 1,11-undecane dicarboxylic acid, etc. Of those, azelaic acid, sebasic acid, and dodecanoic diacid are preferred.

It is to be noted that within a range in which an effect by the present invention is not deteriorated, there can be employed other acid components, for example, aliphatic or aromatic dicarboxylic acids such as glutaric acid, adipic acid, pimelic acid, sberic acid, terephthalic acid, isophthalic acid, and 5-sulphosodium isophthalic acid, etc. These other acid components may be even employed solely or even in mixing of two or more kinds together with the aliphatic dicarboxylic acids having a carbon number of 9–12. It is to be noted that the acid components for raw materials may be even employed in the form of an ester derivative or an acid anhydride.

Other component which constructs the polyester diol in relation to the present invention is ε-caprolactone, and other lactones may be employed as auxiliary components as well as in the No. 1 of the present invention.

As a method for the preparation of the polyester diol in the present invention, the same method can be applied as described in the No. 1 of the present invention.

As content of constructing unit of the polyester diol of the present invention, respective raw materials are employed in a range of a proportion so that (content of constructing unit of the polyester composed of an aliphatic diol and adipic acid)/(content of constructing unit of ε-caprolactone) becomes a range of 5/95–80/20 (weight ratio). Also in the case that a poly-ε-caprolactone is employed, it is the same. In thus-obtained polyester diol, a number average molecular weight ranges in 500–5,000, preferably. 1,500–4,000. In the case of not less than 5,000, crystallinity increases in a soft segment, resulting in that there is not apt to be obtained a spandex filament having sufficient physical properties. The number average molecular weight can be measured by a hydroxyl value (JIS K1557).

A polyurethane is prepared from the polyester diol obtained as described hereinabove and an organic diisocyanate, as described in the present invention No. 1.

As the above-described low molecular weight diol which is a chain extender, there can be employed the branched aliphatic diols to be employed in the present invention or the diol compounds which can be employed together therewith. As an diamine which is a chain extender, there can be employed the same ones as exemplified in the present invention No. 1.

The polyurethane obtained by the above-described methods is employed in a variety of uses in which a usual polyurethane is employed, for example, a thermoplastic elastomer, a hard or soft. urethane foam, an adhesive, an artificial leather, and coating, etc., and particularly, it is preferred to employ for a spandex filament.

It is to be noted that the polyurethane to be employed for the artificial leather in the present invention can be employed in a mode of any one of a solvent-based urethane or water-based urethane and, hereinafter, both will be illustrated.

In the solvent-based urethane to be employed in the present invention, modulus in 100% extension preferably ranges in 15–150 kg/cm$^2$, and preferably 15–70 kg/cm$^2$. In the case that the modulus in 100% extension is less than 15 kg/cm$^2$, durability occasionally becomes worse in a sheet obtained and, it becomes difficult to industrially produce because of a large longitudinal extension in a step for extracting-removing components of a matrix region.

Further, in the case that the modulus in 100% extension is more than 150 kg/cm$^2$, there cannot be obtained an artificial leather having a high density, a low repellent property, and excellent feeling at which the present invention aims.

Since the polyurethane to be employed in the present invention is impregnated into a cloth, it is employed as a solution. As a preferred solvent in the case, there are enumerated dimethyl formamide, dimethyl acetoamide, dioxane, and tetrahydrofran, etc.

In the present invention, an impregnated polyurethane is coagulated by a nonsolvent, and it requires to apply a so-called wet coagulation method. There is not preferred a method in which a solvent is removed by impregnation and drying without coagulating by a nonsolvent, that is, since feeling becomes very hard in a dry-coagulation method and a low repellent feeling is not obtained, it is not preferred. As a liquid in a bath for wet-coagulating a polyurethane, there are typically enumerated water and a mixed solution of water with the above-described solvents. Further, as a solvent to be employed for extracting matrix components of a fine fibers-producible type fiber, there are enumerated aromatic hydrocarbons such as benzene, toluene, and xylene, halogenated hydrocarbons such as trichloroethylene, tetrachloroethylene, and carbon tetrachloride, etc.

In the polyurethane to be employed in the present invention, there can be added a variety of additives such as, for example, a phosphorous-based compound and a halogen-contained compound which are a flame retardant, an antioxidant, an ultraviolet ray absorbent, pigments, dyes, and plasticizers, etc. However, an effect is not shown even though there are added substances simultaneously extracted in a step for extracting a matrix resin component.

Cloth to be employed in the present invention is not particularly limited, and nonwoven cloth and woven cloth can be employed. Of those, there is preferred a nonwoven cloth three-dimensionally entangled. Fibers or filaments constructing the clothes are a fine fibers or filament-producible type fiber or filament having a matrix-domain structure in which a thermoplastic resin which can be extracted and removed by a solvent is a matrix resin components and a fiber-formable thermoplastic resin is a domain component. As the thermoplastic resin which is employed as the domain component, there are enumerated, for example, a polyamide resin and a polyester resin, and as the thermoplastic resin which is employed as the matrix component which can be extracted by a solvent, there are enumerated, for example, a polyolefine, a polystyrene, a modified polyvinyl alcohol-based resin, and a water-soluble polyester resin, etc.

In more detail, as a specific example of the domain component resin for employing in the present invention, there are enumerated 6-nylon, 6,6-nylon, 6,10-nylon, 12-nylon, a spinnable polyamide having an aromatic group, polyethylene terephthalate, polybutylene terephthalate, sulphoisophthalic acid-based polyethylene terephthalate, and sulphoisohpthalic-based polybutylene terephthalate, etc. On the other hand, as a polymer constructing the matrix component resin, there is enumerated a resin which has a different solubility to a solvent from the domain component resin, and which has only a small affinity to the domain component resin and, moreover, which has a smaller melt viscosity than that in the domain component resin under spinning conditions. For example, there are enumerated a polyethylene, a polypropylene, an ethylene-propylene copolymer, an ethylene-vinyl acetate copolymer, an ethylene-acrylate copolymer, an ethylene-α-olefine copolymer, a polystyrene, a hydrogenated product of a styrene-isoprene copolymer, a styrene-butadiene copolymer, a hydrogenated product of a styrene-butadiene copolymer, a modified polyvinyl alcohol, and a modified polyester, etc.

As a method for the preparation of fibers composed of the matrix component resin and the domain component resin, there are enumerated a method in which a spinning is conducted by forming a mixed system while dissolving in an identical dissolving system after mixing the matrix component resin and the domain component resin in a fixed proportion, a method in which a spinning is conducted by dissolving in an independent system, respectively, and by forming a mixed system through repeating a combining-separating of both polymer streams at a head portion of a spinning machine in plural times, and a method in which a spinning is conducted by dissolving in an independent dissolving system, respectively, and by combining both polymer streams each other through regulating a fiber shape at a head portion of a spinning machine. Proportion occupied by the the domain component resin in the fibers is preferably 40–80% by weight, and pieces of very fine fibers in the cross-section of fibers are not less than 5, particularly, those preferably range in 5–10000 pieces. Thus-spun very fine fiber-producible type fibers are optionally through a usual treatment step for fibers such as an extension step and heat-setting step to prepare fibers having size of 2–15 deniers, an average size of not more than 0.2 denier in the very fine fibers, and preferably not more than 0.1 denier and not less than 0.001 denier.

Thus-spun very fine fiber-producible type fibers are bloomed through a blooming machine, followed by forming random web or cross wrap through a weaver and by piling a fiber web obtained in order to give a desired weight and thickness. Subsequently, the fiber web is treated for entangling through conventionally publicly-known methods such as needle punching, water jetting, and air jetting to prepare a nonwoven cloth in which fibers are entangled. Of course, a textile may be even formed after preparing spun fibers or multi-filaments from the very fine fiber-producible type fibers by conventional methods. Further, the nonwoven cloth may be even piled with the textiles.

In fibrous base materials, a density of 0.2–0.5 g/cm$^3$ is preferred before impregnating a polyurethane in order to obtain an excellent filled up-touch and a good feeling and, more preferably, it ranges in 0.25–0.40 g/cm$^3$. In the fibrous base materials, when the density is less than 0.2 g/cm$^3$, surface flatness becomes worse in a sheet obtained. Further, in the case of being more than 0.5 g/cm$^3$, there are not occasionally obtained an excellent filled up-touch and a good feeling which are a purpose in the present invention by high-densification in a sheet obtained.

The sheet which is an artificial leather in relation to the present invention is comprised a cloth which is a textile of very fine fibers and a polyurethane existing in inside clearance of fibers, and the polyurethane exists between a very fine fiber bundle and a very fine fiber bundle and, it is preferred that it does not exist in inside of the very fine fiber bundle. In the case that the polyurethane does not substantially exist in inside of the very fine fiber bundle, very fine fibers are not fixed by the polyurethane, whereby, a sheet obtained is rich in the filled up-touch and, moreover, the fibers in the sheet obtained are sufficiently released from the polyurethane, whereby, there is obtained a rubber-like soft feeling not having a repellent feeling.

In the sheet of the present invention, ratio of the polyurethane in the sheet preferably ranges in 15–60% by weight, and preferably 25–50% by weight. In the case that the ratio of the polyurethane is less than 15% by weight, physical properties such as surface strength occasionally become large with a lapse of time, or feeling by hands occasionally becomes bulky and paper-like. In the case that the ratio of the polyurethane is higher than 60% by weight, surface flatness occasionally becomes worse in the sheet obtained, or feeling occasionally becomes hard.

By forming a surface layer through coating a resin with spraying or gravure, etc. onto a polyurethane-impregnated cloth obtained by the above methods, or, by a method in which a cloth is unified with a resin layer formed on a releasing paper, there can be obtained an artificial leather-like sheet having a silver-colored surface. Further, a suede-like sheet can be also obtained by conducting buffing the surface of the polyurethane-impregnated cloth using a sandpaper, etc.

On the other hand, in the case that the polyurethane emulsion prepared by using a specified polyester diol in the present invention is applied to the artificial leather, hydrolysis resistance is improved compared to an artificial leather obtained by impregnating a polyurethane emulsion prepared using a polyester polyol obtained by condensation reaction of a dibasic acid with glycols, and it is excellent in hydrolysis resistance and heat resistance even though being compared to an artificial leather obtained by impregnating a polyurethane emulsion prepared using a polyether polyol such as polyalkylene glycols or alkylene oxide-adducts. Further, in the case of an artificial leather in which a polyurethane emulsion is impregnated which is prepared by using a specified polyester diol in the present invention, a soft feeling is obtained. As described hereinabove, in a word, there is obtained a very excellent artificial leather having many satisfied physical properties by using a specified polyester diol in the present invention.

EXAMPLES

Hereinafter, although the present inventions No. 1 to No. 5 are specifically illustrated by Examples, the present invention is not limited thereto. It is to be noted that "part" in the Examples and Comparative Examples is "part by weight", so far as not being particularly noticed.

Hereinafter, the present invention No. 1 is specifically illustrated by Examples.

In the Examples and Comparative Examples, compounds employed are named by abbreviations. Table 1-1 shows relationship between the abbreviations and the compounds. Further, there were measured retention ratio of strength, 200%-modulus, and retention ratio of 200%-modulus by the following methods.

(1) Retention ratio of strength: {stress in fracture after an alkali treatment (in the Table, "strength after treatment")/ stress in fracture (in the Table, "strength")}×100%

(2) 200%-modulus: Stress in 200% extension (3) Retention ratio of 200%-modulus: (200%-modulus after an alkali treatment/200%-modulus)×100

TABLE 1-1

| Abbreviated word | Compound |
|---|---|
| BEPD | 2-n-butyl-2-ethyl-1,3-propanediol |
| DEPD | 2,2-diethyl-1,3-propanediol |
| DEND | 2,4-diethyl-1,5-propanediol |
| AA | adipic acid |
| CL | ε-caprolactone |
| NPG | neopentylglycol |
| BD | 1,4-butanediol |
| HD | 1,6-hexanediol |
| MPD | 3-methyl-1,5-pentanediol |

It is to be noted that evaluation of hydrolysis resistance in alkali in relation to a polyurethane elastic fiber obtained was conducted under an alkali atmosphere as shown below.
(Hydrolysis Resistance in Alkali in Relation to a Polyurethane Elastic Fiber)

Polyurethane elastic fiber was immersed in 60 g/liter aqueous solution of sodium hydroxide at 98° C. while maintaining a constant length, and the polyurethane elastic fiber was evaluated by retention ratio of strength and retention ratio of 200%-modulus.

Examples 1-1 to 1-10

There were fed 101 parts a polyester polyol thermally-melted at 80° C. having an average molecular weight of 2000 which has a composition shown in Table 1-2, 39 parts of MDI (4,4'-diphenylmethane diisocyanate) thermally-melted at 45° C., and 9.5 parts of BD into a twin-screw extruder using a volume displacement pump to conduct a continuous melt-polymerization at 240° C. A polyurethane prepared was extruded into water in a strand state to pelletize by cutting. Pellets were dried at 80° C. for 24 hours under a nitrogen stream.

The pellets were spun at a spinning temperature of 217° C. and spinning speed of 600 m/minute by a spinning machine which is a single-screw extruder to obtain an elastic monofilament of the polyurethane having 40 deniers.

Using the elastic monofilament of the polyurethane, various physical properties and hydrolysis resistance in alkali were evaluated. Results are shown in Table 1-3. In all cases, it is excellent in physical properties as fibers and hydrolysis resistance in alkali.

Comparative Examples 1-1 to 1-7

Using polyester polyols as shown in Table 1-3, a polyurethane elastic fiber was obtained by the same procedures as in the Examples. The polyester polyols have (a constructing unit content of a polyester composed of at least one kind selected from the group of 2-n-butyl-2-ethyl-1,3-propanediol, 2,2-diethyl-1,3-propanediol, and 2,4-diethyl-1,5-pentanediol)/(a constructing unit content of ε-caprolactone) of an outside range of 5/95–80/20 (weight ratio). Physical properties and hydrolysis resistance in alkali were evaluated. Results are shown in Table 1-3.

TABLE 1-2

| | Component ratio of Diol (%) | | | | | | | PE (wt %) | CL (wt %) |
|---|---|---|---|---|---|---|---|---|---|
| | BEPD | DEPD | DEND | NPG | ED | BD | HD | Diol/AA | CL |
| Example 1-1 | 100 | | | | | | | 40 | 60 |
| Example 1-2 | | 100 | | | | | | 40 | 60 |
| Example 1-3 | | | 100 | | | | | 40 | 60 |
| Example 1-4 | 100 | | | | | | | 20 | 80 |
| Example 1-5 | 100 | | | | | | | 60 | 40 |
| Example 1-6 | 100 | | | | | | | 80 | 20 |
| Example 1-7 | 50 | | | 50 | | | | 40 | 60 |
| Example 1-8 | 50 | | | | 50 | | | 40 | 60 |
| Example 1-9 | 50 | | | | | 50 | | 40 | 60 |
| Example 1-10 | 50 | | | | | | 50 | 40 | 60 |
| C. Exam. 1-1 | 30 | | | | | 70 | | 100 | 0 |
| C. Exam. 1-2 | 50 | | | | | | 50 | 100 | 0 |
| C. Exam. 1-3 | | | | 100 | | | | 40 | 60 |
| C. Exam. 1-4 | 100 | | | | | | | 100 | 0 |
| C. Exam. 1-5 | | | | | | | 100 | 100 | 0 |
| C. Exam. 1-6 | | | | | | | | 0 | 100 |
| C. Exam. 1-7 | 100 | | | | | | | 95 | 5 |

In the Table 1-2, C. Exam. means Comparative Example.

In the Table, PE (wt %) means the weight proportion of the constructing unit content of a polyester composed obtained from a various diols and dicarboxylic acids, and CL means the constructing unit content of ε-caprolactone.

TABLE 1-3

|  | Strength (g/d) | Extension (%) | 200% modulus (g/d) | Alkali | | | |
|---|---|---|---|---|---|---|---|
|  |  |  |  | Strength A.T (g/d) | Rete. Ratio (%) | 200% modulus (g/d) | Ret. Ratio (%) |
| Example 1-1 | 1.56 | 510 | 0.36 | 1.45 | 93 | 0.33 | 92 |
| Example 1-2 | 1.54 | 514 | 0.36 | 1.46 | 95 | 0.34 | 94 |
| Example 1-3 | 1.58 | 518 | 0.36 | 1.50 | 95 | 0.34 | 94 |
| Example 1-4 | 1.65 | 504 | 0.39 | 1.35 | 82 | 0.32 | 82 |
| Example 1-5 | 1.50 | 528 | 0.34 | 1.38 | 92 | 0.31 | 90 |
| Example 1-6 | 1.40 | 547 | 0.32 | 1.37 | 98 | 0.31 | 96 |
| Example 1-7 | 1.41 | 513 | 0.33 | 1.27 | 90 | 0.29 | 89 |
| Example 1-8 | 1.48 | 521 | 0.32 | 1.30 | 88 | 0.28 | 86 |
| Example 1-9 | 1.52 | 524 | 0.34 | 1.35 | 89 | 0.29 | 86 |
| Example 1-10 | 1.58 | 512 | 0.36 | 1.45 | 92 | 0.32 | 88 |
| C. Exam. 1-1 | 1.28 | 460 | 0.32 | 1.10 | 86 | 0.26 | 82 |
| C. Exam. 1-2 | 1.19 | 512 | 0.28 | 0.98 | 82 | 0.23 | 82 |
| C. Exam. 1-3 | 1.52 | 518 | 0.35 | 0.99 | 65 | 0.22 | 63 |
| C. Exam. 1-4 | 0.75 | 320 | 0.12 | 0.56 | 75 | 0.09 | 72 |
| C. Exam. 1-5 | 1.76 | 405 | 0.44 | 0.97 | 55 | 0.23 | 53 |
| C. Exam. 1-6 | 1.79 | 402 | 0.47 | 0.98 | 55 | 0.25 | 53 |
| C. Exam. 1-7 | 1.29 | 458 | 0.33 | 1.10 | 85 | 0.27 | 81 |

In the Table 1-3, abbreviations are as follows.
C. Exam.: Comparative Example
Strength A.T: Strength after treatment
Rete. Ratio: Retention Ratio As clearly shown in the Table 1-3, it is confirmed that the polyurethane elastic fibers in the Examples 1-1 to 1-10 do not show a remarkable decline of strength and modulus in 200%-extension after hydrolysis in alkali compared to those of the Comparative Examples, and have a satisfied physical properties as fibers. The polyurethane elastic fibers in the Examples 1-1 to 1-10 have (a constructing unit content of a polyester composed of at least one kind selected from the group of 2-n-butyl-2-ethyl-1, 3-propanediol, 2,2-diethyl-1, 3-propanediol, and2,4-diethyl-1,5-pentanediol)/(a constructing unit content of ε-caprolactone) of 5/95–80/20 (weight ratio).

Hereinafter, the present invention No. 2 is specifically illustrated by Examples.

In the Examples and Comparative Examples, compounds employed are named by abbreviations. Table 2-1 shows a relationship between the abbreviations and the compounds. Measurement methods for retention ratio of strength, 200%-modulus, and retention ratio of 200%-modulus are the same as in the present inventions No. 1.

TABLE 2-1

| Abbreviated word | Compound |
|---|---|
| BEPD | 2-n-butyl-2-ethyl-1,3-propanediol |
| MPD | 3-methyl-1,5-pentanediol |
| DEND | 2,4-diethyl-1,5-propanediol |
| AA | adipic acid |
| DA | sebasic acid |
| DDA | dodecanoic diacid |
| CL | ε-caprolactone |
| BD | 1,4-butanediol |
| HD | 1,6-hexanediol |

It is to be noted that evaluations for hydrolysis resistance in alkali of a polyurethane elastic fiber obtained were likewise conducted as in the present inventions No. 1.

Examples 2-1 to 2-10

There were fed 101 parts a polyester polyol thermally-melted at 80° C. having an average molecular weight of 2000 which has a composition shown in Table 2-2, 39 parts of MDI (4,4'-diphenylmethane diisocyanate) thermally-melted at 45° C., and 9.5 parts of BD into a twin-screw extruder using a volume displacement pump to conduct a continuous melt-polymerization at 240° C. A polyurethane prepared was extruded into water in a strand state to pelletize by cutting. Pellets were dried at 80° C. for 24 hours under a nitrogen stream.

The pellets were spun at a spinning temperature of 217° C. and spinning speed of 600 m/minute by a spinning machine which is a single-screw extruder to obtain an elastic monofilament of the polyurethane having 40 denier.

Using the elastic monofilament of the polyurethane, various physical properties and hydrolysis resistance in alkali were evaluated. Results are shown in Table 2-3. In all cases, it is excellent in physical properties as fibers and hydrolysis resistance in alkali.

Comparative Examples 2-1 to 2-7

Using polyester polyols as shown in Table 2-2, a polyurethane elastic fiber was obtained by the same procedures as in the Examples. The polyester polyols have (a constructing unit content of a polyester composed of a branched diol and an aliphatic dicarboxylic acid having a carbon number of 10–12)/(a constructing unit content of ε-caprolactone) of an outside range of 5/95–80/20 (weight ratio). Physical properties and hydrolysis resistance in alkali were evaluated. Results are shown in Table 2-3.

TABLE 2-2

| | Component ratio of Diol (%) | | | | | Acid | PE (wt %) Diol/Acid | CL (wt %) CL |
|---|---|---|---|---|---|---|---|---|
| | BEPD | MPD | DEND | BD | HD | | | |
| Example 2-1 | 100 | | | | | DA | 40 | 60 |
| Example 2-2 | | 100 | | | | DA | 40 | 60 |
| Example 2-3 | | | 100 | | | DA | 40 | 60 |
| Example 2-4 | | 100 | | | | DA | 20 | 80 |
| Example 2-5 | | 100 | | | | DA | 60 | 40 |
| Example 2-6 | | 100 | | | | DA | 80 | 20 |
| Example 2-7 | | 100 | | | | DDA | 40 | 60 |
| Example 2-8 | | 50 | | 50 | | DA | 40 | 60 |
| Example 2-9 | | 50 | | | 50 | DA | 40 | 60 |
| Example 2-10 | | 50 | | | 50 | DDA | 40 | 60 |
| C. Exam. 2-1 | 30 | | | 70 | | AA | 100 | 0 |
| C. Exam. 2-2 | 50 | | | | 50 | AA | 100 | 0 |
| C. Exam. 2-3 | | 100 | | 100 | | AA | 40 | 60 |
| C. Exam. 2-4 | 100 | | | | | AA | 100 | 0 |
| C. Exam. 2-5 | | | | | 100 | AA | 100 | 0 |
| C. Exam. 2-6 | | | | | | AA | 0 | 100 |
| C. Exam. 2-7 | 100 | | | | | AA | 95 | 5 |

In the Table 2-2, C. Exam. means Comparative Example.

In the Table, PE (weight %) means the weight proportion of the constructing unit content of a polyester composed obtained from a various diols and dicarboxylic acids, and CL means the constructing unit content of ε-caprolactone.

relationship between the abbreviations and the compounds. Measurement methods for retention ratio of strength, 200%-modulus, and retention ratio of 200%-modulus are the same as in the present inventions No. 1.

TABLE 2-3

| | Strength (g/d) | Extension (%) | 200% modulus (g/d) | Alkali | | | |
|---|---|---|---|---|---|---|---|
| | | | | Strength A.T (g/d) | Rete. Ratio (%) | 200% modulus (g/d) | Ret. Ratio (%) |
| Example 2-1 | 1.55 | 508 | 0.36 | 1.43 | 92 | 0.33 | 91 |
| Example 2-2 | 1.52 | 513 | 0.36 | 1.41 | 93 | 0.33 | 92 |
| Example 2-3 | 1.51 | 516 | 0.36 | 1.40 | 93 | 0.33 | 92 |
| Example 2-4 | 1.61 | 502 | 0.39 | 1.43 | 89 | 0.34 | 87 |
| Example 2-5 | 1.48 | 519 | 0.34 | 1.35 | 91 | 0.30 | 89 |
| Example 2-6 | 1.42 | 526 | 0.32 | 1.32 | 93 | 0.30 | 93 |
| Example 2-7 | 1.48 | 527 | 0.33 | 1.36 | 92 | 0.30 | 91 |
| Example 2-8 | 1.42 | 530 | 0.32 | 1.26 | 89 | 0.28 | 88 |
| Example 2-9 | 1.52 | 516 | 0.34 | 1.32 | 87 | 0.30 | 88 |
| Example 2-10 | 1.48 | 508 | 0.36 | 1.35 | 91 | 0.31 | 85 |
| C. Exam. 2-1 | 1.28 | 460 | 0.32 | 1.10 | 86 | 0.26 | 82 |
| C. Exam. 2-2 | 1.19 | 512 | 0.28 | 0.98 | 82 | 0.23 | 82 |
| C. Exam. 2-3 | 1.52 | 518 | 0.35 | 0.99 | 65 | 0.22 | 63 |
| C. Exam. 2-4 | 0.75 | 320 | 0.12 | 0.56 | 75 | 0.09 | 72 |
| C. Exam. 2-5 | 1.76 | 405 | 0.44 | 0.97 | 55 | 0.23 | 53 |
| C. Exam. 2-6 | 1.79 | 402 | 0.47 | 0.98 | 55 | 0.25 | 53 |
| C. Exam. 2-7 | 1.29 | 458 | 0.33 | 1.10 | 85 | 0.27 | 81 |

In the Table 2-3, abbreviations are as follows.
C. Exam.: Comparative Example
Strength A.T: Strength after treatment
Rete. Ratio: Retention Ratio As clearly shown in the Table 2-3, it is confirmed that the polyurethane elastic fibers in the Examples 2-1 to 2-10 do not show a remarkable decline of strength and modulus in 200%-extension after hydrolysis in alkali compared to those of the Comparative Examples, and have a satisfied physical properties as fibers. The polyurethane elastic fibers in the Examples 2-1 to 2-10 have (a constructing unit content of a polyester composed of the branched diols and dicarboxylic acids having a carbon number of 10–12)/(a constructing unit content of ε-caprolactone) of 5/95–80/20 (weight ratio).

Hereinafter, the present invention No. 3 is specifically illustrated by Examples.

In the Examples and Comparative Examples, compounds employed are named by abbreviations. Table 3-1 shows a

TABLE 3-1

| Abbreviated word | Compound |
|---|---|
| BEPD | 2-n-butyl-2-ethyl-1,3-propanediol |
| DEPD | 2,2-diethyl-1,3-propanediol |
| DEND | 2,4-diethyl-1,5-pentanediol |
| AA | adipic acid |
| CL | ε-caprolactone |
| NPG | neopentylglycol |
| BD | 1,4-butanediol |
| HD | 1,6-hexanediol |
| MPD | 3-methyl-1,5-pentanediol |

It is to be noted that evaluations for hydrolysis resistance in alkali of a polyurethane elastic fiber obtained were likewise conducted as in the present inventions No. 1.

Examples 3-1 to 3-7

There were fed 101 parts of a polyester polyol thermally-melted at 80° C. having an average molecular weight of 2000 which has a composition shown in Table 3-2, 39 parts of MDI (4,4'-diphenylmethane diisocyanate) thermally-melted at 45° C., and 9.5 parts of BD into a twin-screw extruder using a volume displacement pump to conduct a continuous melt-polymerization at 240° C. A polyurethane prepared was extruded into water in a strand state to pelletize by cutting. Pellets were dried at 80° C. for 24 hours under a nitrogen stream.

The pellets were spun at a spinning temperature of 217° C. and spinning speed of 600 m/minute by a spinning machine which is a single-screw extruder to obtain an elastic monofilament of the polyurethane having 40 denier.

Using the elastic monofilament of the polyurethane, various physical properties and hydrolysis resistance in alkali were evaluated. Results are shown in Table 3-3. In all cases, it is excellent in physical properties as fibers and hydrolysis resistance in alkali.

Comparative Examples 3-1 to 3-7

Using polyester polyols as shown in Table 3-2, a polyurethane elastic fiber was obtained by the same procedures as in the Examples. The polyester polyols do not contain 2,4-diethyl-1,5-pentanediol. Physical properties and hydrolysis resistance in alkali were evaluated. Results are shown in Table 3-3.

TABLE 3-2

| | Component ratio of Diol (%) | | | | | | |
|---|---|---|---|---|---|---|---|
| | BEPD | DEPD | DEND | NPG | ED | BD | HD |
| Example 3-1 | | 10 | | | | | 90 |
| Example 3-2 | | 30 | | | | | 70 |
| Example 3-3 | | 50 | | | | | 50 |
| Example 3-4 | | 70 | | | | | 30 |
| Example 3-5 | | 30 | 40 | | | | 30 |
| Example 3-6 | | 30 | | 40 | | | 30 |
| Example 3-7 | 50 | 30 | | | | 40 | 30 |

TABLE 3-2-continued

| | Component ratio of Diol (%) | | | | | | |
|---|---|---|---|---|---|---|---|
| | BEPD | DEPD | DEND | NPG | ED | BD | HD |
| C. Exam. 3-1 | 30 | | | | | 70 | |
| C. Exam. 3-2 | 50 | | | | | | 50 |
| C. Exam. 3-3 | | | | 100 | | | |
| C. Exam. 3-4 | 100 | | | | | | |
| C. Exam. 3-5 | | | | | | | 100 |
| C. Exam. 3-6 | | | 100 | | | | |
| C. Exam. 3-7 | 100 | | | | | | |

In the Table 3-2, C. Exam. means Comparative Example.

TABLE 3-3

| | Strength (g/d) | 200% Extension (%) | modulus (g/d) | Alkali Strength A.T (g/d) | Ret. Ratio (%) | 200% modulus (g/d) | Ret. Ratio (%) |
|---|---|---|---|---|---|---|---|
| Example 3-1 | 1.65 | 504 | 0.39 | 1.35 | 82 | 0.32 | 82 |
| Example 3-2 | 1.50 | 528 | 0.34 | 1.38 | 92 | 0.31 | 90 |
| Example 3-3 | 1.40 | 547 | 0.32 | 1.37 | 98 | 0.31 | 96 |
| Example 3-4 | 1.41 | 513 | 0.33 | 1.27 | 90 | 0.29 | 89 |
| Example 3-5 | 1.56 | 510 | 0.36 | 1.45 | 93 | 0.33 | 92 |
| Example 3-6 | 1.54 | 514 | 0.36 | 1.46 | 95 | 0.34 | 94 |
| Example 3-7 | 1.58 | 518 | 0.36 | 1.50 | 96 | 0.34 | 94 |
| C. Exam. 3-1 | 1.28 | 460 | 0.32 | 1.10 | 86 | 0.26 | 82 |
| C. Exam. 3-2 | 1.19 | 512 | 0.28 | 0.98 | 82 | 0.23 | 82 |
| C. Exam. 3-3 | 1.52 | 518 | 0.35 | 0.99 | 65 | 0.22 | 63 |
| C. Exam. 3-4 | 0.75 | 320 | 0.12 | 0.56 | 75 | 0.09 | 72 |
| C. Exam. 3-5 | 1.76 | 405 | 0.44 | 0.97 | 55 | 0.23 | 53 |
| C. Exam. 3-6 | 1.79 | 402 | 0.47 | 0.98 | 55 | 0.25 | 53 |
| C. Exam. 3-7 | 1.29 | 468 | 0.33 | 1.10 | 85 | 0.27 | 81 |

In the Table 3-3, abbreviations are as follows.
C. Exam.: Comparative Example
Strength A.T: Strength after treatment
Rete. Ratio: Retention Ratio As clearly shown in the Table 3-3, it is confirmed that the polyurethane elastic fibers in the Examples 3-1 to 3-7 do not show a remarkable decline of strength and modulus in 200%-extension after hydrolysis in alkali compared to those of the Comparative Examples, and have a satisfied physical properties as fibers. The polyurethane elastic fibers in the Examples 3-1 to 3-7 have a polyester diol containing 10–70% of a specified diol by mol based on diol components constructing the polyester diol.

Hereinafter, the present invention No. 4 is specifically illustrated by Examples.

Synthesis Example 4-1

A glass-made flask equipped with a condenser, a tube for supplying nitrogen, a thermometer, and an agitator was charged with 129.3 g of bis[3-(2H-benzotriazole-2-yl)4-hydroxy-benzene ethanol]methane (a trade name of "MBEP" manufactured by Otsuka Kagaku, Ltd.), 170.3 g of ε-caprolactone, and 50 ppm of mono-n-butyltin aliphatic acid salt (a trade name of "SCAT-24" manufactured by Sankyo Yuki Gosei, Ltd.). After having maintained a reaction temperature at 150° C. for 6 hours, concentration of ε-caprolactone in a reaction liquid was measured by a gas-chromatograph, and the reaction was terminated at the concentration of 0.43%. Reaction product was a liquid-state substance at room temperatures having an acid value (mgKOH/g) of 1.8, a viscosity of 2645 CP/60° C., a number average molecular weight (MN) by GPC of 1391, a weight average molecular weight (MW) by GPC of 1688, and MW/MN=1.213.

Synthesis Example 4-2

The same apparatus as in the Synthesis Example 4-1 was charged with 93.7 g of bis[3-(2H-benzotriazole-2-yl)4-hydroxy-benzene ethanol]methane (a trade name of "MBEP" manufactured by Otsuka Kagaku, Ltd.), 206.3 g of ε-caprolactone, and 50 ppm of mono-n-butyltin aliphatic acid salt (a trade name of "SCAT-24" manufactured by Sankyo Yuki Gosei, Ltd.). After having maintained a reaction temperature at 150° C. for 6 hours, concentration of ε-caprolactone in a reaction liquid was measured by a gas-chromatograph, and the reaction was terminated at the concentration of 0.55%. Reaction product was a substance which is a solid at room temperature having an acid value (mgKOH/g) of 2.5, a viscosity of 987 CP/60° C., MN of 2017, MW of 2465, and MW/MN=1.222.

Example 4-1

Polyester polyols were prepared from an ε-caprolactone-modified polyol obtained in the Synthesis Example 4-1 and Synthesis Example 4-2 and adipic acid, or MBEP employed in the Synthesis Examples and adipic acid, respectively. The polyester polyols and thermally-melted MDI (4,4'-diphenylmethane diisocyanate), and BD (1,4-butanediol) were fed into a twin-screw extruder using a volume displacement pump to conduct a continuous melt-polymerization at 240° C. A polyurethane prepared was extruded into water in a strand state to pelletize by cutting. Pellets were dried at 80° C. for 24 hours under a nitrogen stream. The pellets were spun at a spinning temperature of 217° C. and spinning speed of 600 m/minute by a spinning machine which is a single-screw extruder to obtain a 40 denier elastic monofilament of the polyurethane. Since the elastic monofilament of the polyurethane has an ultraviolet ray absorbable group in the molecule, it is more excellent in weatherability and washing resistance compared to a spandex filament in which an ultraviolet ray absorbent is added.

Hereinafter, the present invention No. 5 is specifically illustrated by Examples.

<Experimental Method>

Various properties and parameters of copolymers in the present invention were measured as follows.

(1) Evaluation of solubility to solvents

As being shown in Examples 5-1 to 5-6 and Comparative Examples 5-1 to 5-2, a polymer solution was prepared, and outer appearance when cooled to room temperature (25° C.) was observed. Evaluation is as follows, when the solution is opaque, it is worse, and when it is transparent, it is good.

(2) Preparation of an experimental sample

In order to evaluate an applicability as an additive for a spandex polymer, a polymer film sample was prepared which contains an additive.

In the preparation of the film sample, a polymer solution was prepared, substantially, according to a method described in the Example 5-1. Subsequently, the polymer solution was completely mixed with 20 g of an N,N-dimethylacetamide solvent containing a desired amount of an experimental additive. Subsequently, the polymer solution containing the additive was stood for 30 minutes.

Subsequently, a film was cast on "Mylar (Mylar)" which is a polyester sheet using a doctor knife device having a broad gap of 0.51 cm.

N,N-dimethylacetamide solution was cast to obtain an experimental sample having a dimension of approximately 20.3 cm×8.9 cm. The film cast was dried in air for 24 hours, and the experimental sample was stripped from the "Mylar" sheet.

After preparation of the experimental sample, the sample was immersed in a water bath. In order to suppose a water bath for washing, the sample was immersed in a bath having 2 liters of water containing 8 g of "Duponol (Duponol)" which is an anion surface active agent (diethanolamine laurylsulphate manufactured by E.I. Dupon't, Ltd.), 5 g of sodium tetrapirorate, and 1.5 g of ethylenediamine tetracetate for 1 hour. After having taken out the sample, and even a trace amount of the additives in the bath was repeatedly washed and removed using a pure water until becoming not detected in water.

Example 5-1

<Preparation of a copolymer (copolymer 1) of a dialkyl aminoethyl(meth)acrylate with a monomethacrylate of ε-caprolactone-modified ethyleneglycol>

Using a 300 cc 4-necked flask equipped with an agitator, a thermometer, a dropping funnel, and a device for supplying nitrogen, first of all, the flask was sufficiently purged by nitrogen, and 25 g of dimethylacetamide (DMAc) was added, followed by heating to 85° C. so that temperature in the flask becomes constant. Subsequently, various components having the weight described below were dropped into the flask at a constant speed over 4 hours.

2,2-azobis-2-methylbutyronitrile (ABN-E): 0.675 g

Diisopropyl aminoethylmethacrylate (DIPAM): 45 g

Placcel FM2D (an ε-caprolactone-adduct of ethyleneglycol monomethacrylate: manufactured by Daicel Chemical Industries, Ltd.): 15 g Dimethylacetamide (DMAc): 15.4 g Dropping reaction was terminated after 4 hours, subsequently, an aging reaction was conducted at 85° C. for 1 hour, followed by adding 0.675 g of ABN-E into the flask. After that, a reaction was conducted at temperature of 85° C. for 3 hours. Solid components concentration (N.V.) was 57.1%, and a molecular weight of a polymer was measured by a gel permeation chromatographic (GPC) method, and the following results were obtained.

It is to be noted that in order to evaluate a solubility to DMAc, an outer appearance was observed at room temperature (25° C.).

A solution obtained was transparent, and it was confirmed that the solubility is excellent.

Number average molecular weight Mn: 13700

Weight average molecular weight Mw: 46100

Molecular weight distribution Mw/Mn: 3.36

Examples 5-2 to 5-6

<Preparation of copolymers (copolymers 2–6) of a dialkyl aminoethyl(meth)acrylate with a monomethacrylate of ε-caprolactone-modified ethyleneglycol>

The same procedures as in the Example 5-1 were likewise conducted except that a solution having composition shown in Table 5-1 was added dropwise to obtain copolymers 2–6. Table 5-1 collectively shows results (incapability of measuring means incapability of detecting because of a close refraction index to a solvent) of a solid concentration, a GPC analysis, and a solubility to DMAc.

Comparative Examples 5-1 to 5-2

<Preparation of dialkyl aminoethyl(meth)acrylate-based copolymers (comparative copolymers 1–2) not having a monomethacrylate of ε-caprolactone-modified ethyleneglycol as a constructing component>

The same procedures as in the Example 5-1 were likewise conducted except that a solution having composition shown in Table 5-1 was added dropwise to obtain copolymers 1 and 2. Table 5-1 collectively shows results (incapability of measuring means incapability of detecting because of a close refraction index to a solvent) of a solid components concentration, a GPC analysis, and a solubility to DMAc.

Examples 5-7 to 5-12 and Comparative Examples 5-3 to 5-4

<Evaluation of heat set efficiency in a spandex film containing an additive which is a copolymer (copolymers 2 to 6) of a dialkyl aminoethyl(meth)acrylate with a monomethacrylate of ε-caprolactone-modified ethyleneglycol>

An N,N-dimethylacetamide solution of a segmented polyurethane was prepared according to a general method (for example, first descriptions in Example 11 and descriptions in Example I) described in U.S. Pat. No. 3,428,711

A mixture was prepared by completely mixing p,p'-methylenediphenyl diisocyanate and polytetramethylene glycol (a molecular weight of approximately 1800) in a molar ratio of 1.63, followed by preparing an isocyanate-terminatedpolyether (that is, a terminal-treated glycol having an NCO content of 2.40%) while maintaining temperature at approximately 80–90° C. for 90–100 minutes. And then, it was cooled to 60° C. and mixed with N,N-dimethylacetamide to obtain a solution having a solid content of approximately 45%. Subsequently, the terminal-treated glycol was allowed to react with diethylamine, ethylenediamine and 1,3-cyclohexylene diamine of molar ratio of 90/10 which are a chain extender at temperature of approximately 75° C. for 2–3 minutes while vigorously agitating. Molar ratio of the diamine chain extender with respect to diethylamine was 6.3, and an unreacted segmented polyurethane in the glycol terminal-treated by the diamine chain extender contained approximately 36% of solid and showed a viscosity of approximately 2100 poise at 40° C. A variety of additives were dispersed in dimethylacetamide which is a solvent, followed by completely mixing with a polymer solution to prepare a solution containing a solid content of 2% of the copolymers 1–6 obtained in the Examples 5-1 to 5-6, 3% of zinc oxide, 1.5% of "Syanox" 1790 which is a sterically-hindered phenol-based anti oxidant [2,4,6-tris(2,6-dimethyl-4-t-butyl-3-hydroxybenzyl) isocyanurate], and 0.01% of a silicone oil in a final film. Herein, all the concentration is based on the weight of spandex polymer. A film of thus-prepared solution was cast, and washed by the water-based solvent described hereinabove before a test. Efficiency of heat-set was measured, and results are collectively shown in Table 5-1.

TABLE 5-1

|  | Example | | | | | | Comparative Example | |
|---|---|---|---|---|---|---|---|---|
|  | 1 | 2 | 3 | 4 | 5 | 6 | 1 | 2 |
| Initial Feed DMAc | 25 | 25 | 25 | 25 | 25 | 25 | 25 | 25 |
| Dropping composition | | | | | | | | |
| DMAc | 15.4 | 15.4 | 15.4 | 15.4 | 15.4 | 15.4 | 15.4 | 15.4 |
| ABN-E | 0.675 | 0.675 | 0.300 | 0.675 | 0.675 | 0.675 | 0.675 | 0.675 |
| DIPAM | 45 | 45 | 45 | | | | 45 | 45 |
| DEAM | | | | 45 | | | | |
| DMAM | | | | | 45 | | | |
| DMAA | | | | | | 45 | | |
| PCL-FM2D | 15 | 7.5 | 15 | 15 | 15 | 15 | | |
| n-decyl-MA | | | | | | | 15 | |
| lauryl-MA | | 7.5 | | | 15 | | | |
| Delayed Feed | | | | | | | | |
| ABN-E | 0.675 | 0.675 | 0.675 | 0.675 | 0.675 | 0.675 | 0.675 | 0.675 |
| N.V. (%) | 57.1 | 58.3 | 57.8 | 56.9 | 59.7 | 58.2 | 57.7 | 58.8 |
| Mn | 13700 | 12500 | 14000 | THF-based: incapable of measuring by GPC | THF-based: incapable of measuring by GPC | THF-based: incapable of measuring by GPC | 14500 | 12700 |
| Mw | 46100 | 33800 | 246000 | | | | 32700 | 29800 |
| Mw/Mn | 3.36 | 2.70 | 17.6 | | | | 2.26 | 2.34 |

|  | Example | | | | | | Comparative Example | |
|---|---|---|---|---|---|---|---|---|
|  | 7 | 8 | 9 | 10 | 11 | 12 | 3 | 4 |
| Solubility to DMAc | Excellent | Excellent | Excellent | Excellent | Excellent | Excellent | Bad | Bad |
| HSE (more than 70%:excellent) | 82 | 80 | 85 | 78 | 76 | 75 | 80 | 81 |

DIPAM: Diisopropyl aminoethylmethacrylate
DMAC: Dimethylacetoamide
DEAM: Diethyl aminoethylmethacrylate
DMAM: Dimethyl aminoethylmethacrylate
DMAA: Dimethyl aminoethylacrylate
HSE: Heat-set efficiency Even in the all experiments, excellent results were obtained.

The above-described results in the Examples show an advantageous effect which affects to an excellent solubility to a solvent and heat-set efficiency in the case that the additives which are a copolymer of a dialkyl aminoethyl (meth)acrylate with a monomethacrylate of ε-caprolactone-modified ethyleneglycol is added to a spandex.

Possibility of Utilization in Industry

As being clear from the above-described results in the Examples, since a polyurethane elastic fiber having an excellent hydrolysis resistance in alkali and a high tensile strength property can be obtained according to the present inventions No. 1, 2, and 3, it can largely contribute to an industrial field.

As being clear from the above descriptions, since a polyurethane elastic fiber having an excellent weatherability and an excellent washing resistance can be obtained according to the present invention No. 4, it can largely contribute to an industrial field.

The novel dialkylamino group-contained acrylic-based copolymer which is the present invention No. 5 shows a higher solubility to DMAC which is a solvent, and it protects a polyurethane and a spandex polymer from deterioration and discoloration. In a polyurethane composition and a spandex composition which contain the copolymer, a decrease of elasticity is improved in relation to the use of an already-known high molecular weight tertiary amino group-contained additive having a steric hindrance, and it has an excellent permanent extension property.

An excellent artificial leather can be obtained by the use of a polyurethane prepared using a specified polyester diol in the present invention No. 6.

What is claimed is:

1. A polyurethane which is a copolymer of: (i) a polyester polyol composition (X) which is a copolymer of a polyol (A1) having an ultraviolet absorbing group and/or a lactone-modified polyol (A2) derived therefrom, optionally one or more other polyol components (A3), and adipic acid; and (ii) an organic diisocyanate (Y).

2. The polyurethane according to claim 1, wherein the polyol (A1) is the compound represented by formula (1):

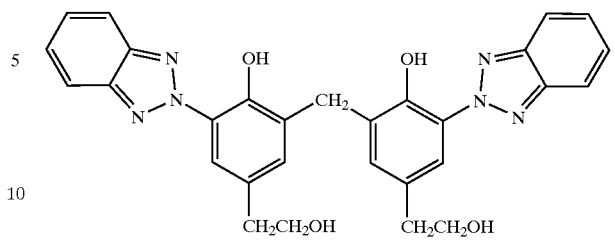

3. The polyurethane according to claim 1, wherein said lactone is ε-caprolactone.

4. The polyurethane according to claim 2, wherein said lactone is ε-caprolactone.

5. The polyurethane according to any one of claims 1–4, wherein the number average molecular weight of the polyester diol ranges from 500 to 5,000.

6. The polyurethane according to any one of claims 3–4, wherein the proportion of ε-caprolactone is between 20% and 95% by weight of the polyester.

7. The polyurethane according to any one of claims 3–4, wherein the proportion of ε-caprolactone is between 20% and 95% by weigh of the polyester, and wherein the number average molecular weight of the polyester diol ranges from 500 to 5,000.

8. The polyurethane according to any one of claims 1–4, wherein the molar ratio {(A1)+(A2)}/{(A1)+(A2)+(A3)} of polyols in said polyol composition is from 0.01 to 1.0.

9. The polyurethane according to claim 5, wherein the molar ratio {(A1)+(A2)}/{(A1)+(A2)+(A3)} of polyols in said polyol composition is from 0.01 to 1.0.

10. A spandex filament which comprises a polyurethane according to any one of claims 1–4.

11. A spandex filament which comprises a polyurethane according to claim 5.

12. A spandex filament which comprises a polyurethane according to claim 6.

13. A spandex filament which comprises a polyurethane according to claim 7.

14. A spandex filament which comprises a polyurethane according to claim 8.

15. A spandex filament which comprises a polyurethane according to claim 9.

* * * * *

UNITED STATES PATENT AND TRADEMARK OFFICE
Certificate

Patent No. 6,500,911 B1                          Patented: December 31, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Toshio Endo, Ohtake, Japan.

Signed and Sealed this Twenty-ninth Day of March 2005.

JAMES J. SEIDLECK
*Supervisory Patent Examiner*
Art Unit 1711